US009836217B2

(12) United States Patent
Stabrawa et al.

(10) Patent No.: US 9,836,217 B2
(45) Date of Patent: *Dec. 5, 2017

(54) PROVISIONING OF EXTERNAL MEMORY

(71) Applicant: Kove Corporation, Chicago, IL (US)

(72) Inventors: Timothy A. Stabrawa, Lombard, IL (US); Zachary A. Cornelius, Chicago, IL (US); John Overton, Chicago, IL (US); Andrew S. Poling, Lombard, IL (US); Jesse I. Taylor, Glenside, PA (US)

(73) Assignee: Kove IP, LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/554,655

(22) Filed: Nov. 26, 2014

(65) Prior Publication Data

US 2016/0077975 A1    Mar. 17, 2016

Related U.S. Application Data

(63) Continuation of application No. 14/530,908, filed on Nov. 3, 2014, now Pat. No. 9,626,108.
(Continued)

(51) Int. Cl.
G06F 3/06 (2006.01)
G06F 12/08 (2016.01)
(Continued)

(52) U.S. Cl.
CPC .......... G06F 3/0607 (2013.01); G06F 3/0604 (2013.01); G06F 3/067 (2013.01);
(Continued)

(58) Field of Classification Search
CPC ...................... G06F 12/0223; G06F 2212/264
See application file for complete search history.

(56) References Cited

U.S. PATENT DOCUMENTS 6,049,853 A    4/2000 Kingsbury et al.
7,925,711 B1   4/2011 Gopalan et al.
(Continued)

FOREIGN PATENT DOCUMENTS

WO    WO 2008/132760 A2    11/2008

OTHER PUBLICATIONS

Al-Moayed et al., Quality of Service Attributes in Web Services, 2010, IEEE, 6 pages.*
(Continued)

Primary Examiner — Gary W Cygiel
(74) Attorney, Agent, or Firm — Brinks Gilson & Lione

(57) ABSTRACT

Dynamically provisionable and allocatable memory external to a requesting apparatus may be provided. A request for primary memory may be made by an application executing on a client. An allocation logic unit may determine an allocation strategy in response to the request. As part of the allocation strategy, the allocation logic unit may identify memory appliances on which memory regions are to be allocated. The allocated memory regions may form the primary memory that is allocated to the requesting application. The allocation logic unit may send region allocation requests to region access unit of the respective memory appliances. The memory appliances on which the memory regions are allocated may be external to the client. The application may access the allocated memory regions via client-side access in which one or more processors in the client and/or the memory appliances are bypassed.

22 Claims, 7 Drawing Sheets

Related U.S. Application Data

(60) Provisional application No. 62/051,144, filed on Sep. 16, 2014.

(51) Int. Cl.
*H04L 29/08* (2006.01)
*G06F 12/10* (2016.01)
*G06F 12/109* (2016.01)

(52) U.S. Cl.
CPC .......... *G06F 3/0631* (2013.01); *G06F 3/0647* (2013.01); *G06F 3/0683* (2013.01); *G06F 12/08* (2013.01); *G06F 12/109* (2013.01); *H04L 67/1097* (2013.01); *G06F 12/10* (2013.01); *G06F 2212/1048* (2013.01); *G06F 2212/152* (2013.01); *Y02B 60/1225* (2013.01)

(56) References Cited

U.S. PATENT DOCUMENTS

| | | | |
|---|---|---|---|
| 8,307,154 | B2 | 11/2012 | Stabrawa et al. |
| 8,745,276 | B2 | 6/2014 | Bloch et al. |
| 8,775,755 | B2 | 7/2014 | Magenheimer et al. |
| 8,799,914 | B1 | 8/2014 | Metcalf |
| 8,914,458 | B2 | 12/2014 | Raindel et al. |
| 9,015,426 | B2 | 4/2015 | Stabrawa et al. |
| 2003/0188114 | A1 | 10/2003 | Lubbers et al. |
| 2004/0093389 | A1 | 5/2004 | Mohamed et al. |
| 2004/0143562 | A1* | 7/2004 | Chen ................ G06F 17/30595 |
| 2004/0143718 | A1 | 7/2004 | Chen et al. |
| 2004/0221102 | A1 | 11/2004 | Watanabe |
| 2005/0044301 | A1 | 2/2005 | Vasilevsky et al. |
| 2005/0204045 | A1 | 9/2005 | Belkin et al. |
| 2006/0236063 | A1 | 10/2006 | Hausauer et al. |
| 2008/0104337 | A1 | 5/2008 | Velureunni |
| 2008/0235409 | A1 | 9/2008 | Ryzhykh |
| 2009/0113425 | A1 | 4/2009 | Ports et al. |
| 2012/0221803 | A1* | 8/2012 | Stabrawa .............. G06F 3/0611 711/154 |
| 2012/0222052 | A1 | 8/2012 | Magenheimer et al. |
| 2013/0185720 | A1 | 7/2013 | Tuch et al. |
| 2013/0290546 | A1* | 10/2013 | Samih ..................... G06F 13/14 709/226 |
| 2014/0089451 | A1 | 3/2014 | Eran et al. |
| 2014/0164545 | A1 | 6/2014 | Davis et al. |
| 2015/0020071 | A1 | 1/2015 | Phelan et al. |
| 2015/0293881 | A1 | 10/2015 | Raikin |
| 2016/0077761 | A1 | 3/2016 | Stabrawa et al. |
| 2016/0077966 | A1 | 3/2016 | Stabrawa et al. |
| 2016/0077975 | A1 | 3/2016 | Stabrawa et al. |

OTHER PUBLICATIONS

Hannes Mühleisen et al., "Peak Performance—Remote Memory Revisited," dated Jun. 24, 2013, pp. 1-7, DaMoN'13, New York, NY.
Kevin Te-Ming Lim, "Disaggregated Memory Architectures for Blade Servers," dated 2010, pp. 1-148, The University of Michigan, Ann Arbor, MI.
Shuang Liang et al., "Swapping to Remote Memory over InfiniBand: An Approach using a High Performance Network Block Device," dated Sep. 2005, pp. 1-10, The Ohio State University, Columbus, OH.
Shuang Liang et al. "Swapping to Remote Memory over InfiniBand: An Approach using a High Performance Network Block Device," dated Sep. 2005, pp. 1-30, Cluster Computing, 2005. IEEE International, Conference located in Burlington, MA.
Stephen Mathew Rumble, "Memory and Object Management in RAMCloud," dated Mar. 2014, pp. 1-161, Stanford University, Stanford, CA.

International Search Report, dated Dec. 8, 2015, pp. 1-14, International Application No. PCT/US2015/050170, European Patent Office, Rijswijk, Netherlands.
Partial International Search Report, dated Dec. 17, 2015, pp. 1-8, International Application No. PCT/US2015/050177, European Patent Office, Rijswijk, Netherlands.
Katnegermis, "rdma/rdma_server.c at master . katnegermis/rdma . GitHub", dated May 6, 2014, pp. 1-7, available at http://github.com/katnegermis/rdma/blob/master/rdma_server.c.
Katnegermis, "rdma/rdma_common.c at master . katnegermis/rdma . GitHub", dated Apr. 27, 2014, pp. 1-4, available at https://github.com/katnegermis/rdma/blob/master/rdma_common.c.
Robert Russell, "Introduction to RDMA Programming", dated Apr. 17, 2014, pp. 1-76, available at http://web.archive.org/web/20140417205540/http://www.cs.unh.edu/~rdr/rdma-intro-module.ppt.
Anonymous, "Implementing calloc()", dated Apr. 12, 2010, pp. 1-3, available at http://web.archive.org/web/20100412183814/http://locklessinc.com/articles/calloc/.
International Search Report, dated May 4, 2016, pp. 1-28, International Application No. PCT/US2015/050177, European Patent Office, Rijswijk, Netherlands.
Konstantinos Karampogias, "An In-Memory RDMA-Based Architecture for the Hadoop Distrubuted Filesystem Master Thesis," dated Aug. 21, 2012, pp. 25-31, ftp://ftp.tik.ee.ethz.ch/pub/students/2012-FS/MA-2012-04.pdf.
Office Action, dated Apr. 8, 2016, pp. 1-21, U.S. Appl. No. 14/530,908, Alexandria, VA.
"Remote direct memory access", dated May 12, 2016, pp. 1-2, Wikipedia, https://en.wikipedia.org/wiki/Remote_direct_memory_access.
U.S. Office Action, dated Jul. 5, 2006, pp. 1-22, issued in U.S. Appl. No. 14/530,908, U.S. Patent and Trademark Office, Alexandria, VA.
Liran Liss, "On Demand Paging for User-level Networking", dated Sep. 30, 2013, pp. 1-25, Mellanox Technologies.
Liran Liss, "On-Demand-Paging (ODP) Update", dated Apr. 28, 2014, available at https://www.youtube.com/watch?v=KbrisXQbHCw.
Anonymous, "Remote direct memory access," dated Dec. 30, 2014, pp. 1-2, XP055288069, Retrieved from the Internet at URL: https://en.wikipedia.org/w/index.php?titie=Remote_direct_memory access&oldid=640243457.
Anonymous, "Copy-on-write," dated Nov. 26, 2014, pp. 1-3, XP055288087, Retrieved from the Internet at URL: https://en.wikipedia.org/w/index.php?title=Copy-on-write&oldid=635508783.
Chao Wang et al., "NVMalloc: Exposing an Aggregate SSD as a Memory Partition in Extreme-Scale Machines", dated 2012, pp. 957-968, *Parallel & Distributed Processing Symposium (IPDPS), 2012 IEEE 26th International, Shanghai*.
"hugetlbpage", dated Sep. 13, 2015, pp. 1-6, The Linux Kernel Archives, https://www.kernel.org/doc/Documentation/vm/hugetlbpage.txt.
Iulian Moraru, "nvmalloc", dated Feb. 27, 2013, p. 1, GitHub, https://github.com/efficient/nvram/tree/master/nvmalloc.
Dall, C., et al., "KVM/ARM: The Design and Implementation of the Linux ARM Hypervisor," dated Mar. 1, 2014, pp. 333-347, *ASPLOS '14*, Mar. 1-4, 2014, Salt Lake City, UT, Copyright is held by the owner/author(s). Publication rights licensed to ACM. ACM 971-1-4503-3205-5/14/03.
Van Essen, B., et al., "DI-MMAP-a scalable memory-map runtime for out-of-core data-intensive applications," dated Oct. 4, 2013, pp. 15-28, Cluster Comput (2015) 18:15-28, DOI 10.01007/s10586-013-0309-0, © The Authors 2013. Published with open access at Springerlink.com.
Kivity, Avi, "kvm: the Linux Virtual Machine Monitor," dated Jun. 27, 2007, pp. 225-232, Proceedings of the Linux Symposium, vol. 1, Jun. 27-30, 2007, Ottawa, Ontario, Canada.
Triplett, Josh, "Using the KVM API," dated Sep. 29, 2015, pp. 1-12, available at URL: https://lwn.net/Articles/658511.
Sorensen, J., "KVM Live Snapshot support," dated Jun. 1, 2011, pp. 1-22, LinuxCon Japan, Jun. 1, 2011.

(56) References Cited

OTHER PUBLICATIONS

"Warning: The xenpaging code is new and not fully debugged . . . ", retrieved Jan. 27, 2016, at URL: https://xenbits.xen.org/docs/4.3-testing/,misc/xenpaging.txt.
Extended European Search Report, dated Jul. 28, 2016, pp. 1-11, issued in European Patent Application No. 16162354.1, European Patent Office, Munich, Germany.
Van Essen, Brian, "tagged_page.c" (source code file is part of DI-MMAP, Version 1.0), dated 2012, pp. 1-13, Lawrence Livermore National Security, LLC, retrieved from https://bitbucket.org/vanessen/di-mmap/src.
Van Essen, Brian, "Snippet of 'tagged_page.c'" (source code file is part of DI-MMAP, Version 1.0), dated 2012, p. 1, Lawrence Livermore National Security, LLC, retrieved from https://bitbucket.org/vanessen/di-mmap/src.
Van Essen, Brian, "helpers.c" (source code file is part of DI-MMAP, Version 1.0), dated 2012, pp. 1-19, Lawrence Livermore National Security, LLC, retrieved from https://bitbucket.org/vanessen/di-mmap/src.
Van Essen, Brian, "Snippet of 'helpers.c'" (source code file is part of DI-MMAP, Version 1.0), dated 2012, p. 1, Lawrence Livermore National Security, LLC, retrieved from https://bitbucket.org/vanessen/di-mmap/src.
"Memory Resource Controller" (memory cgroup documentation—Kernel.org), pp. 1-23, Jan. 25, 2016, Kernel.org, retrieved from https://www.kernel.org/doc/Documentation/cgroup-v1/memory.txt.
Office Action, dated Jun. 29, 2017, pp. 1-13, U.S. Appl. No. 15/621,537, United States Patent and Trademark Office, Alexandria, VA.
Office Action, dated Oct. 23, 2017, pp. 1-12, U.S. Appl. No. 14/854,657, U.S. Patent and Trademark Office, Alexandria, VA.

\* cited by examiner

PROVISIONING OF EXTERNAL MEMORY

This application is a continuation application of, and claims priority under 35 USC §120 to, U.S. Non-Provisional patent application Ser. No. 14/530,908, entitled "DYNAMICALLY PROVISIONABLE AND ALLOCATABLE EXTERNAL MEMORY," filed Nov. 3, 2014, the entire contents of which are incorporated by reference, which claims priority under 35 USC §119(e) to, U.S. Provisional Patent Application 62/051,144, "DYNAMICALLY PROVISIONABLE AND ALLOCATABLE EXTERNAL MEMORY" filed Sep. 16, 2014, the entire contents of which are incorporated by reference.

BACKGROUND

1. Field of Invention

This invention relates to storage and retrieval of data in memory, and in particular, to the scaling of external memory.

2. Background of the Invention

In many computing systems, memory is used to hold programs and data that are part of a working set of one or more tasks being performed by the system. The tasks may be performed in a process and/or a thread. The working set of the process and/or the thread may be a set of pages in a virtual address space of the process and/or the thread that are currently resident in the memory as opposed to the set of pages in the virtual address space that are swapped out of the memory. When used for this purpose, the memory is referred to as primary memory, or main memory. In other words, the primary memory may be memory in which the working sets of the processes executed by the system are stored. Primary memory is typically associated with a single computer system and is often physically located inside the computer system or directly attached to computer system's memory controller. In a non-uniform memory access (NUMA) architecture, the computer system may contain multiple CPU's, and each CPU may have some primary memory associated with it and/or directly attached to the CPU's memory controller. Primary memory is often arranged in pages, where a page is a unit of access or control supported by a memory controller. Primary memory is typically comprised of very fast media, such as random access memory (RAM).

Computing systems also typically have a form of secondary memory, which is used to hold programs and data that are not part of the working set of the tasks being performed by the system. The programs and data stored in secondary memory may be stored in a file system or be located in virtual memory pages that have been swapped out of primary memory by a virtual memory system. Virtual memory pages may be stored in a swap partition or in a swap file on a file system. Secondary memory may be associated with one or more computer systems and may be arranged in a variety of ways, such as physically located inside the computer system, directly attached to the CPU bus, attached to a peripheral bus, or connected to a peripheral via a cable or switched fabric. Secondary memory is typically comprised of slower media, such as flash memory or spinning disk.

Typically, primary memory media is more expensive than secondary memory media. Consequently, computing systems may have larger secondary memory capacity and a limited primary memory capacity. The limited primary memory capacity may limit the working set of tasks being performed by the computing system. Increasing the primary memory capacity of the computing system may be prohibitive due to large costs involved. Additionally, the computing system may not have a large number of tasks being performed all the time, and therefore, portions of the primary memory, at times, may not be in use. Thus, large primary memory capacity may not only be expensive, but also not operational all the time.

BRIEF DESCRIPTION OF THE DRAWINGS

The embodiments may be better understood with reference to the following drawings and description. The components in the figures are not necessarily to scale, emphasis instead being placed upon illustrating the principles of the invention. Moreover, in the figures, like-referenced numerals designate corresponding parts throughout the different views.

DETAILED DESCRIPTION

The present disclosure provides a technical solution to solve a technical problem of providing scalable primary memory to a computing system. The primary memory may scale on demand. The primary memory may be external to the computing system. Further, a technical solution is described to solve a technical problem of using available primary memory capacity optimally. Various other technical problems and their respective technical solutions are also provided and will be evident to persons skilled in the art.

For example, it may be beneficial to provide primary memory to a local machine from an aggregated "pool" of memory, which may be referred to as a 'memory pool'. The memory pool may be external to the local machine. The memory pool may involve multiple memory appliances, and the memory pool may scale to an infinite or arbitrarily large number of memory appliances without performance irregularities due to the scaling. The technical solutions described may enable an installation, such as a server cluster, or an administrator to provision primary memory to servers or persons, associated with the installation, with dynamic policies like quotas. Further, the technical solutions described may enable dynamic allocation of memory by applications from the memory pool on demand, whenever needed. The technical solutions described may further enable primary memory of a local machine, such as a single server to balloon to any size needed and shrink back to original size when the larger memory capacity is no longer needed, irrespective of the original memory capacity of the server and substantially without a limit on how large the memory pool may become.

Figure 1:
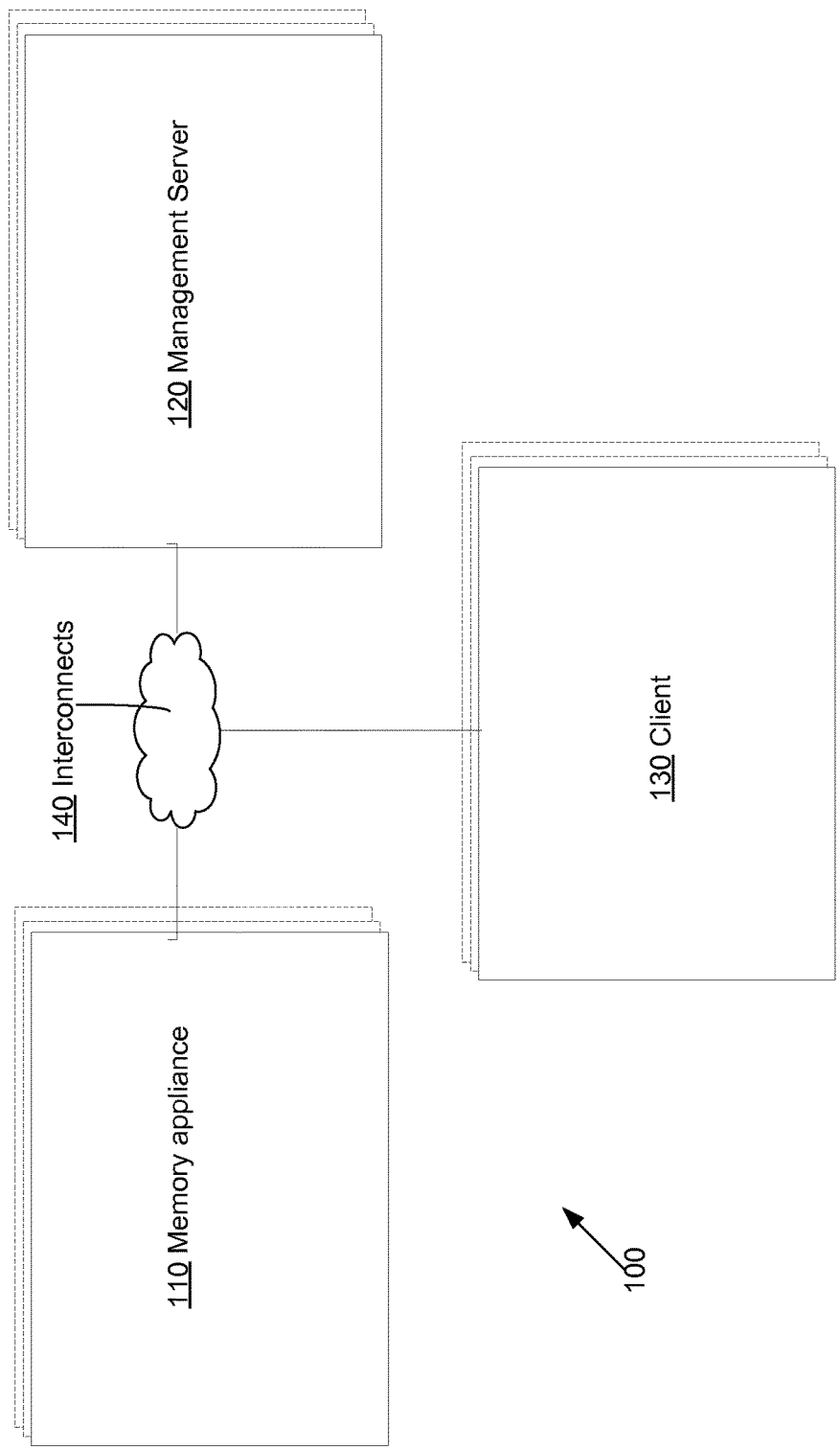
FIG. 1 illustrates a hardware diagram of an example external memory system.

FIG. 1 illustrates a hardware diagram of an example external memory system 100. The external memory system may include a memory appliance 110, a management server 120, a client 130, and one or more interconnects 140. The external memory system may include more, fewer, or different elements. For example, the external memory system may include multiple clients, multiple memory appliances, and/or multiple management servers. Alternatively, the external memory system may include just the client, just the memory appliance, and/or just the management server.

The memory appliance 110 may include memory that may be externally allocatable as primary memory. Henceforth, throughout this disclosure, unless specified otherwise, "memory" refers to primary memory. The management server 120 may be a memory pool manager, responsible to allocate and/or manipulate memory allocations for the client 130 using the memory appliance 110. The client 130 may be a machine or a device requesting external memory. The client 130 may contain local memory that operates as the primary memory of the client 130. However, the external memory allocation may be requested by the client to scale the capacity of the primary memory available locally. Alternatively, or in addition, the client 130 may operate the locally available primary memory as a cache memory when accessing the externally allocated memory from the memory appliance 110. For example, cache memory may be used by the client to reduce average time to access data from the externally allocated memory. The locally available primary memory may be faster than the externally allocated memory and may be used to store copies of data from frequently used memory locations of the externally allocated memory. For example, the client may read data from or write data to a location in the externally allocated memory. The client may first check whether a copy of the data is in the cache memory, such as the locally available memory. If so, the client may read the data from or write the data to the cache memory, which may be faster than reading from or writing to the externally allocated memory.

The memory appliance 110, the management server 120, and the client 130 may communicate with each other over the interconnects 140. The communication may be unidirectional or bi-directional. An interconnect may electrically couple the memory appliance 110, the management server 120, and/or the client 130. Each of the interconnects 140 may include a physical component that transports signals between two or more devices. For example, an interconnect may be a cable, a wire, a parallel bus, a serial bus, a network, a switched fabric, a wireless link, a point to point network, or any combination of components that transport signals between devices. Alternatively or in addition, the memory appliance 110, the management server 120, and the client 130 may communicate over a communication network, such as a switched fabric, a Storage Area Network (SAN), an InfiniBand network, a Local Area Network (LAN), a Wireless Local Area Network (WLAN), a Personal Area Network (PAN), a Wide Area Network (WAN), a circuit switched network, a packet switched network, a telecommunication network or any other now known or later developed communication network. The communication network, or simply "network", may enable a device to communicate with components of other external devices, unlike buses that only enable communication with components within and/or plugged into the device itself. Thus, a request for primary memory made by an application executing on the client 130 may be sent over the interconnect 140, such as the network. The request may be sent to devices external to the client 130, such as the management server 120 and/or the memory appliances 110. In response to the request, the application that made the request may be allocated memory from memories of one or more memory appliances that are external to the client 130, instead of being allocated a portion of memory locally available inside the client 130 itself.

The management server 120 may dynamically allocate and/or manipulate external memory allocations for the client 130. An external memory allocation may reference one or more regions in the memory appliance 110. The management server 120 may allocate and/or manipulate the regions in the memory appliance 110 using region access logic requests. The client 130 may allocate and/or manipulate external memory allocations and/or regions using allocation logic requests.

Multiple memory appliances may be "pooled" to create a dynamically allocatable, or allocable, external memory pool. For example, new memory appliances may be discovered, or as they become available, memory of, or within, the new memory appliances may be made part of the memory pool. The memory pool may be a logical construct. The memory pool may be multiple memory appliances known to and/or associated with the management server 120. The memory appliances involved in the memory pool may not know about each other. As additional memory appliances are discovered, the memory of the memory appliances may be added to the memory pool, in other words, the portions of the memory of the memory appliances is made available for use by the requesting client 130. The client 130 may be able to request dynamically allocatable external memory from the memory pool which may be available for use, even though the external memory exists on other machines, unknown to the client 130. The client 130, requesting memory, at time of requesting the memory, may be unaware of the size of the memory pool or other characteristics related to configuration of the memory pool. The memory pool may increase or decrease at any time without a service interruption of any type to the memory consumers, such as the machines requesting memory.

The external memory allocations may span multiple memory appliances. Thus, the external memory system 100 makes available memory capacity, larger than what may be possible to fit into the requesting client 130, or a single memory appliance 110, or a single server. The memory capacity made available may be unlimited since any number of memory appliances may be part of the memory pool. The memory pool may be expanded based on various conditions being met. For example, the maximally price-performant memory available may be selected to grow the memory pool in a maximally cost-efficient manner. Alternatively, or in addition, memory appliances may be added at any moment to extend the capacity and performance of the aggregate pool, irrespective of characteristics of the memory appliances. In contrast, the individual client 130, such as a server computer, may be limited in physical and local memory capacity, and moreover, in order to achieve the largest memory capacity, expensive memory may have to be used or installed in the individual client 130 absent dynamically allocatable external memory.

Instead, with dynamically allocatable external memory, such as the memory pool, one no longer needs to buy expensive large servers with large memory capacity. One may instead buy smaller more energy-efficient and cost-effective servers and extend their memory capacity, on demand, by using dynamically allocatable external memory.

The memory pool may be managed by the management server 120. The management server 120, using various components, may provision external primary memory to the client 130 or multiple clients that request external memory allocation. The memory pool manager may provision external memory to different clients at different times according to different policies, contracts, service level agreements (SLAs), performance loads, temporary or permanent needs, or any other factors.

For example, the client 130 may be server cluster. By using external memory allocation and provisioning, the server cluster need not require servers to have sufficient pre-existing local memory in order to process all anticipated loads. A typical approach to have each individual server to have full capacity memory leads to over-purchasing memory for all servers in order to satisfy exceptional cases needed by some servers, some of the time. Instead, with external memory, the server cluster may provision portions of external memory where and when needed, thereby saving money, space, and energy, by providing on-demand memory to any capacity. The server cluster may even support memory capacities impossible to physically fit into a single machine.

In another example, external memory may be dynamically allocated according to performance ratings of the external memory. For example, higher-performance external memory may be provisioned for some purposes, and/or lower-performance, but larger capacity and/or lower cost, external memory for other purposes.

The memory pool may provide dynamic memory allocation so that the client 130 may request to receive external memory, and when the external memory is no longer needed, the client 130 may release the external memory back to the memory pool. The dynamic memory allocation may enable the client 130 to allocate a provisioned amount of external memory for various purposes on the client 130 at various times, on-the-fly, according to client-logic needs rather than based on an installation policy, or local, internal memory of a particular server.

The client 130 may access the dynamically allocatable external memory through a variety of methods. The different methods to access the external memory may vary the lowest level addressing used to address the external memory. The client 130 may be provided with different interfaces for each respective access method. For example, the access methods may provide physical mapping, programmatic APIs, or any other application-specific interface, to use the external memory so as to solve a multitude of diverse problems in optimal ways for every case. The different access methods may even be employed at the same time, and even against the same external memory allocation.

Depending upon the access method used, external memory operations may not be constrained to memory page size. For some access methods, external memory operations may be as small as a single byte or character and scale to any degree.

In an example, the dynamically allocatable external memory may enable multiple clients to share an external memory allocation. The multiple clients, in this case, may access and/or operate on the data in the shared external memory allocation at the same time. Thus, external and scalable shared memory may be provided to the multiple clients concurrently.

As described throughout this disclosure, external memory operations may be carried out via direct communication, referred to as a client-side memory access, between the client 130 and the memory appliance 110 that is part of the memory pool. The client-side memory access provides a consistent low latency, such as 2 micro-seconds. The client-side memory access also provides determinacy, or in other words a predictable performance, such as a determinate amount of time for a given memory operation to be performed. Thus, by using the client-side memory access, the dynamically allocatable external memory provides a high level of determinacy and consistent performance scaling even as more memory appliances and external memory clients are deployed and/or used for dynamic load balancing, aggregation, and/or re-aggregation.

Dynamically allocatable external memory may also be persistent, meaning the data stored in the external memory is durable over time. This extends the memory paradigm to include the persistence aspects of external storage while retaining the performance of memory. This provides performance of memory with conveniences of a storage paradigm.

Figure 2:
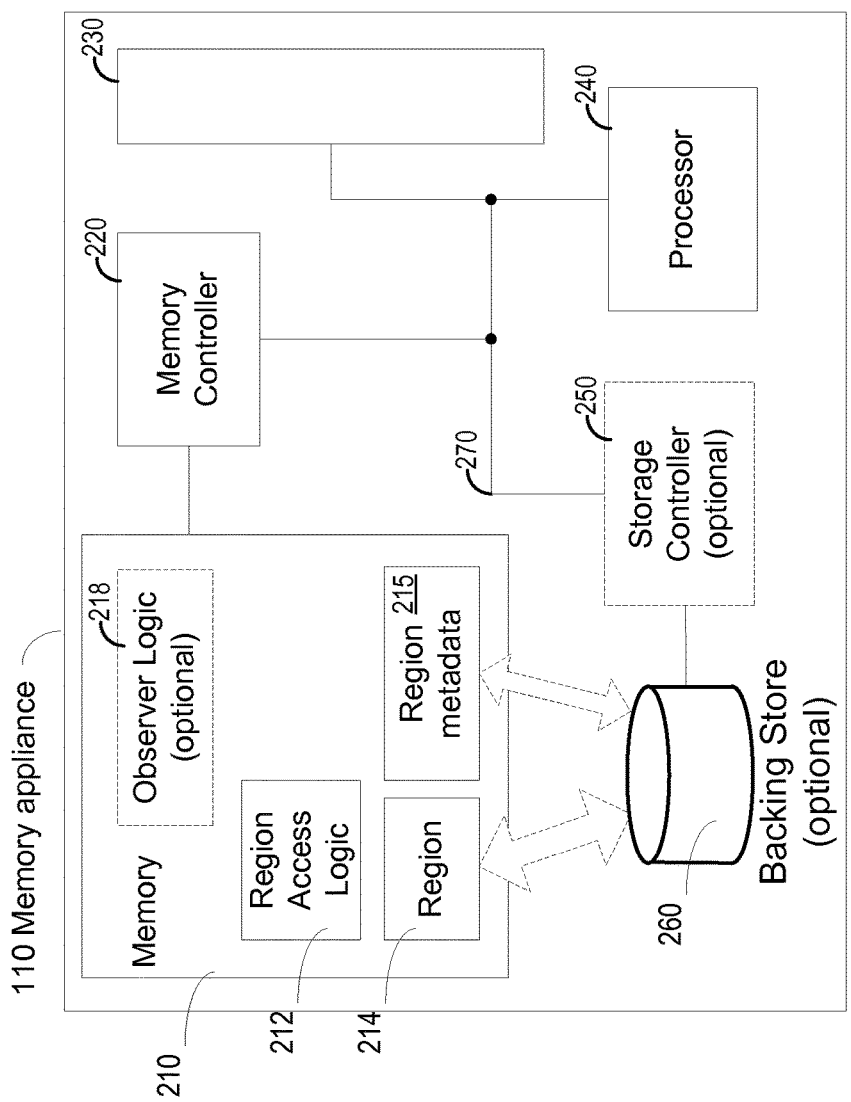
FIG. 2 illustrates an example memory appliance.

FIG. 2 illustrates the example memory appliance 110. By way of example, the system 100 for dynamically allocatable external memory may store data of one or more regions in one or more memory appliances. The memory appliance 110 may be a server, a device, an embedded system, a circuit, a chipset, an integrated circuit, a field programmable gate array (FPGA), an application-specific integrated circuit, a virtual machine, an operating system, a kernel, a device driver, a device firmware, a hypervisor service, a cloud computing interface, and/or any other hardware, software, and/or firmware entity which may perform the same functions as described. The memory appliance 110 may include a memory 210, a memory controller 220, a communication interface 230, a processor 240, a storage controller 250, and a backing store 260. In other examples, the memory appliance may contain different elements. For example, in another example, the memory appliance 110 may not include the storage controller 250 and the backing store 260. The memory 210 may further include a region access logic 212, one or more regions 214, region metadata 215, and an observer logic 218. The observer logic 218 may not be present in other example memory 210. The region access logic 212 and/or the observer logic 218 may be referred to as a region access unit and/or a observer unit respectively. The memory appliance may include more, fewer, or different elements. For example, the memory appliance 110 may include multiple backing stores, multiple storage controllers, multiple memories, multiple memory controllers, multiple processors, or any combination thereof. The memory appliance 110 may store data received over the one or more interconnects 140.

The region access logic 212 in the memory appliance 110 may register the regions 214 or portions of the regions with one or more communication interfaces 230. Alternatively, or in addition, the region access logic 212 may provide and/or control access to the region 214 by one or more clients and/or one or more management servers. A communication interface in the client 130 may provide client-side memory access to the memory 210 of the memory appliance 110, to the regions 214, and/or to portions of the regions in the memory appliance 110. One or more interconnects or networks may transport data between the communication interface of the client 130 and the communication interface 230 of the memory appliance 110. For example, the communication interfaces may be network interface controllers or host controller adaptors.

A client-side memory access may bypass a processor, such as a CPU (Central Processing Unit), at the client 130 and/or may otherwise facilitate the client 130 accessing the memory 210 on the memory appliance 110 without waiting for an action by the processor included in the client 130, in the memory appliance, or both. For example, the client-side memory access may be based on the Remote Direct Memory Access (RDMA) protocol. The RDMA protocol may be carried over an InfiniBand interconnect, an iWARP interconnect, an RDMA over Converged Ethernet (RoCE) interconnect, and/or any other interconnect and/or combination of interconnects known now or later discovered. Alternatively, or in addition, the client-side memory access may be based on any other protocol and/or interconnect that may be used for accessing memory. A protocol that may be used for accessing memory may be a CPU protocol/interconnect, such as HyperTransport and/or Quick Path Interconnect (QPI). Alternatively, or in addition, a protocol that may be used for accessing memory may be a peripheral protocol/interconnect, such as Peripheral Component Interconnect (PCI), PCI Express, PCI-X, ISA, and/or any other protocol/interconnect used to interface with peripherals and/or access memory. The communication interfaces may provide reliable delivery of messages and/or reliable execution of memory access operations, such as any memory access operation carried out when performing the client-side memory access. Alternatively, or in addition, delivery of messages and/or execution of memory access operations may be unreliable, such as when data is transported between the communication interfaces using the User Datagram Protocol (UDP). The client 130 may read, write, and/or perform other operations on the memory 210, to the regions 214 within the memory 210, and/or to portions of the regions using client-side memory access. In providing client-side memory access, the client 130 may transmit requests to perform memory access operations to the memory appliance 110. In response, the memory appliance 110 may perform the memory access operations. Similar to as done by the storage device of U.S. patent application Ser. No. 13/036,544, filed Feb. 28, 2011, entitled "High performance data storage using observable client-side memory access" by Stabrawa, et al., which published as US Patent Application Publication US2012/0221803 A1, and which is hereby incorporated by reference, the memory appliance 110 may observe or otherwise identify the memory access operations. In response to identifying the memory access operations, the memory appliance 110 may, for example, copy the data of the region 214 to one or more backing stores 260 independently of performing the memory access operations on the memory 210. A backing store 260 may include one or more persistent non-volatile storage media, such as flash memory, phase change memory, memristors, EEPROM, magnetic disk, tape, or some other media. The memory 210 and/or the backing store 260 (if included) may be subdivided into regions.

The memory appliance may be powered by a single power source, or by multiple power sources. Examples of the power source include a public utility, internal or external battery, an Uninterruptible Power Supply (UPS), a facility UPS, a generator, a solar panel, any other power source, or a combination of power sources. The memory appliance may detect the condition of the one or more power sources that power the storage device.

The memory 210 may be any memory or combination of memories, such as a solid state memory, a random access memory (RAM), a dynamic random access memory (DRAM), a static random access memory (SRAM), a flash memory, a read-only memory (ROM), an electrically erasable programmable read-only memory (EEPROM), a flash memory, a phase change memory, a memristor memory, any type of memory configured in an address space addressable by the processor, or any combination thereof. The memory 210 may be volatile or non-volatile, or a combination of both.

The memory 210 may be a solid state memory. Solid state memory may include a device, or a combination of devices, that stores data, is constructed primarily from electrical conductors, semiconductors and insulators, and is considered not to have any moving mechanical parts. Solid state memory may be byte-addressable, word-addressable or block-addressable. For example, most dynamic RAM and some flash RAM may be byte-addressable or word-addressable. Flash RAM and other persistent types of RAM may be block-addressable. Solid state memory may be designed to connect to a memory controller, such as the memory controller 220 in the memory appliance 110, via an interconnect bus 270, such as the interconnect 270 in the memory appliance 110.

Solid state memory may include random access memory that permits stored data to be read and/or written in any order (for example, at random). The term "random" refers to the fact that any piece of data may be returned and/or written within a constant time period, regardless of the physical location of the data and regardless of whether the data is related to a previously read or written piece of data. In contrast, storage devices such as magnetic or optical discs rely on the physical movement of the recording medium or a read/write head so that retrieval time varies based on the physical location of the next item read and write time varies based on the physical location of the next item written. Examples of solid state memory include, but are not limited to: DRAM, SRAM, NAND flash RAM, NOR flash RAM, phase change memory (PRAM), EEPROM, FeRAM, MRAM, CBRAM, PRAM, SONOS, RRAM, Racetrack memory, NRAM, Millipede, T-RAM, Z-Ram, and TTRAM.

In contrast to solid state memory, solid state storage devices are systems or devices that package solid state memory with a specialized storage controller through which the packaged solid state memory may be accessed using a hardware interconnect that conforms to a standardized storage hardware interface. For example, solid state storage devices include, but are not limited to: flash memory drives that include Serial Advanced Technology Attachment (SATA) or Small Computer System Interface (SCSI) interfaces, Flash or DRAM drives that include SCSI over Fibre Channel interfaces, DRAM drives that include SATA or SCSI interfaces, and USB (universal serial bus) flash drives with USB interfaces.

The memory 210 may include the region access logic 212, the region 214, and the region metadata 215. In an example, each portion of the memory 210 that includes a corresponding one of the region access logic 212, the region 214, and the region metadata 215 may be of a different type than the other portions of the memory 210. For example, the memory 210 may include a ROM and a solid state memory, where the ROM includes the region access logic 212, and the solid state memory includes the region 214 and the region metadata 215. The memory 210 may be controlled by the memory controller 220. The memory 210 may include more, fewer, or different components. For example, the memory may include the observer logic 218.

The processor 240 may be a general processor, a central processing unit (CPU), a server, a microcontroller, an application specific integrated circuit (ASIC), a digital signal processor, a field programmable gate array (FPGA), a digital circuit, an analog circuit, or any combination thereof. The processor 240 may include one or more devices operable to execute computer executable instructions or computer code embodied in the memory 210 or in other memory to perform features of the external memory system. For example, the processor 240 may execute computer executable instructions that are included in the observer logic 218 and the region access logic 212.

The processor 240, the memory controller 220, and the one or more communication interfaces 230 may each be in communication with each other. Each one of the processor 240, the memory controller 220, and the one or more communication interfaces 230 may also be in communication with additional components, such as the storage controller 250, and the backing store 260. The communication between the components of the memory appliance 110 may be over an interconnect, a bus, a point-to-point connection, a switched fabric, a network, any other type of interconnect, or any combination of interconnects 270. The communication may use any type of topology, including but not limited to a star, a mesh, a hypercube, a ring, a torus, or any other type of topology known now or later discovered. Alternatively or in addition, any of the processor 240, the memory 210, the memory controller 220, and/or the communication interface 230 may be logically or physically combined with each other or with other components, such as with the storage controller 250, and/or the backing store 260.

The memory controller 220 may include a hardware component that translates memory addresses specified by the processor 240 into the appropriate signaling to access corresponding locations in the memory 210. The processor 240 may specify the address on the interconnect 270. The processor 240, the interconnect 270, and the memory 210 may be directly or indirectly coupled to a common circuit board, such as a motherboard. In one example, the interconnect 270 may include an address bus that is used to specify a physical address, where the address bus includes a series of lines connecting two or more components. The memory controller 220 may, for example, also perform background processing tasks, such as periodically refreshing the contents of the memory 210. In one example implementation, the memory controller 220 may be included in the processor 240.

The one or more communication interfaces 230 may include any one or more physical interconnects used for data transfer. In particular, the one or more communication interfaces 230 may facilitate communication between the memory appliance 110 and the client 130, between the memory appliance 110 and the management server 120, between the memory appliance 110 and any other device, and/or between the management server 120 and any other device. The one or more communication interfaces 230 may communicate via the one or more interconnects. The one or more communication interfaces 230 may include a hardware component. In addition, the one or more communication interfaces 230 may include a software component. Examples of the communication interface include a Direct Memory Access (DMA) controller, an RDMA controller, a Network Interface Controller (NIC), an Ethernet controller, a Fibre Channel interface, an InfiniBand interface, a SATA interface, a SCSI interface, a USB interface, an Ethernet interface, or any other physical communication interface. The one or more communication interfaces 230 may facilitate client-side memory access, as described throughout this disclosure.

The region 214 may be a configured area of the memory 210 that is accessible via a memory access protocol and/or storage protocol now known or later discovered. Storage protocols and memory access protocols are described elsewhere in this disclosure. The region 214 may be a logical region which maps a sequence of data blocks to corresponding memory locations in the memory 210. Therefore, in addition to the data blocks themselves, the region 214 may include region information, such as a mapping of data blocks to memory locations or any other information about the data blocks. The data blocks of the region 214, which may be configured by the region access logic 212, may all be stored in the memory 210. The volume information may or may not be included in the memory 210. Accordingly, when the region 214 is said to be included in the memory 210, at least the data blocks of the region 214 (the data stored in the region) are included in the memory 210. Alternatively, or in addition, the volume information may be included in the region metadata 215.

The region metadata 215 may include properties, configuration parameters, and/or access parameters related to the region 214.

Properties may include the size of the region, references to portions within the memory allocated to the region 214, and/or any other aspects describing the region 214, its data, its memory, and/or its backing store.

Configuration parameters may include an indication of whether or not the region 214 may be persisted to the backing store 260, an indication of what method may be used to persist the region 214 to the backing store 260, an identifier which may be used to locate persisted data related to the region 214, and/or any other parameters used to specify how the region 214 may behave or be treated.

Access parameters may include a list of zero or more communication interfaces 230 included in the memory appliance 110 which may be used to access the region 214, a list of zero or more clients, memory appliances, and/or management servers which are allowed to access the region 214, a list of zero or more communication interfaces of clients, memory appliances, and/or management servers which are allowed to access the region 214, a password which may be used to authenticate access to the region 214, an encryption key which may be used to authenticate access to the region 214, access permissions, and/or any other parameters used to specify how the region may be accessed.

Access permissions may include a mapping of access method to permissions granted and/or revoked. Access methods may include: via a specified communication interface 230 included in the memory appliance 110; via a specified communication interface of a client, memory appliance, and/or management server; by a specified client; by a specified memory appliance; by a specified management server; using a specified password; using a specified encryption key; and/or any other identifiable method used to access the region.

Permissions may include data read access, data write access, metadata read access, metadata write access, destroy access, and/or any other capability that may be selectively granted and/or revoked to a client, a memory appliance, and/or a management server. For example, the access parameters may include access permissions that indicate that a particular management server may read the metadata for the region 214, but may not read and/or write the data of the region 214. In a second example, the access parameters may include access permissions that indicate that a particular client may read the data for the region 214, but may not write the data for the region 214.

The storage controller 250 of the memory appliance 110, of the management server 120, and/or of the client 130 may include a component that facilitates storage operations to be performed on the backing store 260. A storage operation may include reading from or writing to locations within the backing store 260. The storage controller 250 may include a hardware component. Alternatively or in addition, the storage controller 250 may include a software component.

The backing store 260 of the memory appliance 110, of the management server 120, and/or of the client 130 may include an area of storage comprising one or more persistent media, including but not limited to flash memory, phase change memory, Memristors, EEPROM, magnetic disk, tape, or other media. The media in the backing store 260 may potentially be slower than the memory 210 on which the region 214 is stored.

The storage controller 250 and/or backing store 260 of the memory appliance 110 may be internal to the memory appliance 110, a physically discrete component external to the memory appliance 110 and coupled to the backing store 260, included in a second memory appliance or in a device different from the memory appliance 110, included in the management server 120, included in the client 130, part of a server, part of a backup device, part of a storage device on a Storage Area Network, and/or part of some other externally attached persistent storage. Alternatively, or in addition, a region included in a different memory appliance may be used as the backing store for the memory appliance 110.

Figure 3:
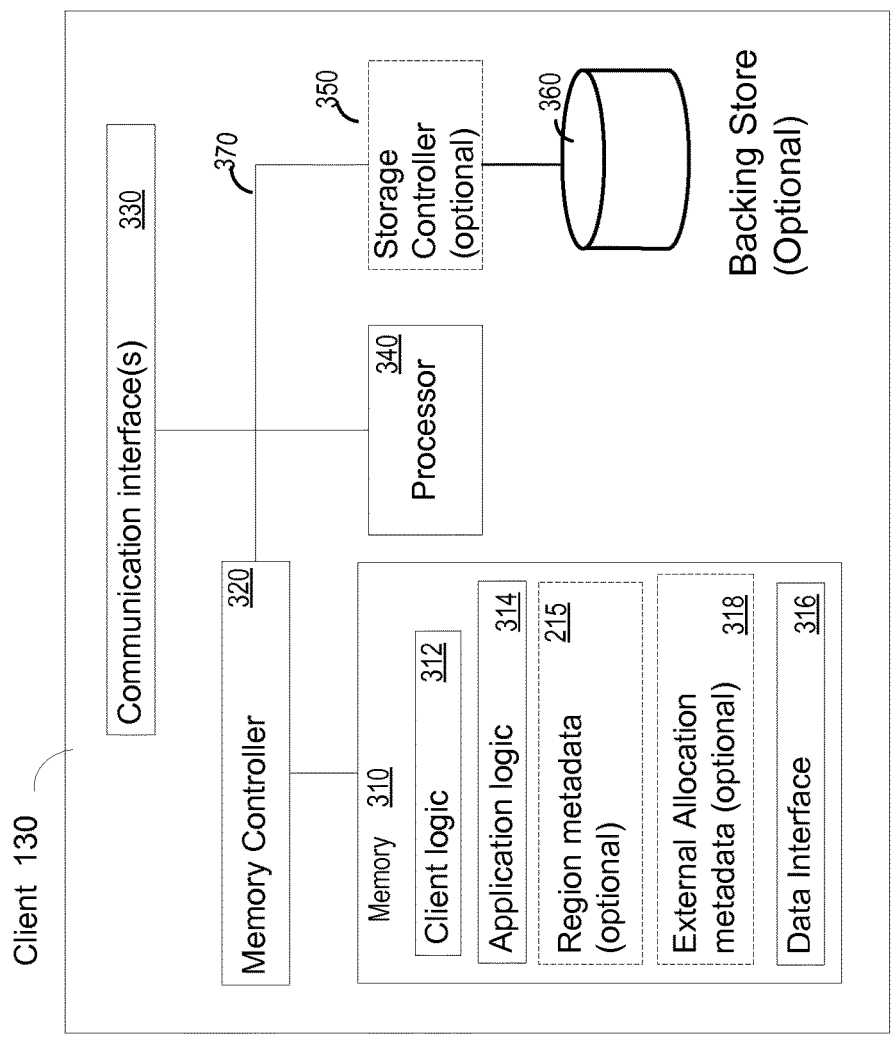
FIG. 3 illustrates an example client.

FIG. 3 illustrates the example client 130. The client 130 may include a memory 310, a memory controller 320, a processor 340, and a communication interface 330, similar to the memory 210, the processor 240, the communication interface 230, and the memory controller 220 of the memory appliance 110. The client 130 may include more, fewer, or different components. For example, the client 130 may include a storage controller 350, a backing store 360, multiple storage controllers, multiple backing stores, multiple memories, multiple memory controllers, multiple processors, or any combination thereof. Alternatively, the client 130 may just include a process executed by the processor 340.

The storage controller 350 and/or backing store 360 of the client 130 may be internal to the client 130, a physically discrete device external to the client 130 that is coupled to the client 130, included in a second client or in a device different from the client 130, included in the management server 120, included in the memory appliance 110, part of a server, part of a backup device, part of a storage device on a Storage Area Network, and/or part of some other externally attached persistent storage. Alternatively, or in addition, the region 214 included in the memory appliance 110 may be used as the backing store 360 for the client 130.

The memory 310 of the client 130 may include a client logic 312. The memory 310 of the client 130 may include more, fewer, or different components. For example, the memory 310 of the client 130 may include an application logic 314, the region metadata 215, a data interface 316, and/or external memory allocation metadata 318. The processor 340 may execute computer executable instructions that are included in the client logic 312 and/or the application logic 314. Alternatively, or in addition the client logic 312, the application logic 314, and/or the data interface 316 may be referred to as a client logic unit 312, an application logic unit 314 and/or a data interface unit, respectively. The components of the client 130 may be in communication with each other over an interconnect 370, similar to the interconnect 270 in the memory appliance 110 or over any other type of interconnect.

The application logic 314 may include a user application, an operating system, a kernel, a device driver, a device firmware, a virtual machine, a hypervisor, a container, a jail, a cloud computing interface, a circuit, a logical operating system partition, or any other logic that uses the services provided by the client logic 312. The application logic 314 may be embedded in a chipset, an FPGA, an ASIC, a processor, or any other hardware device.

Figure 4:
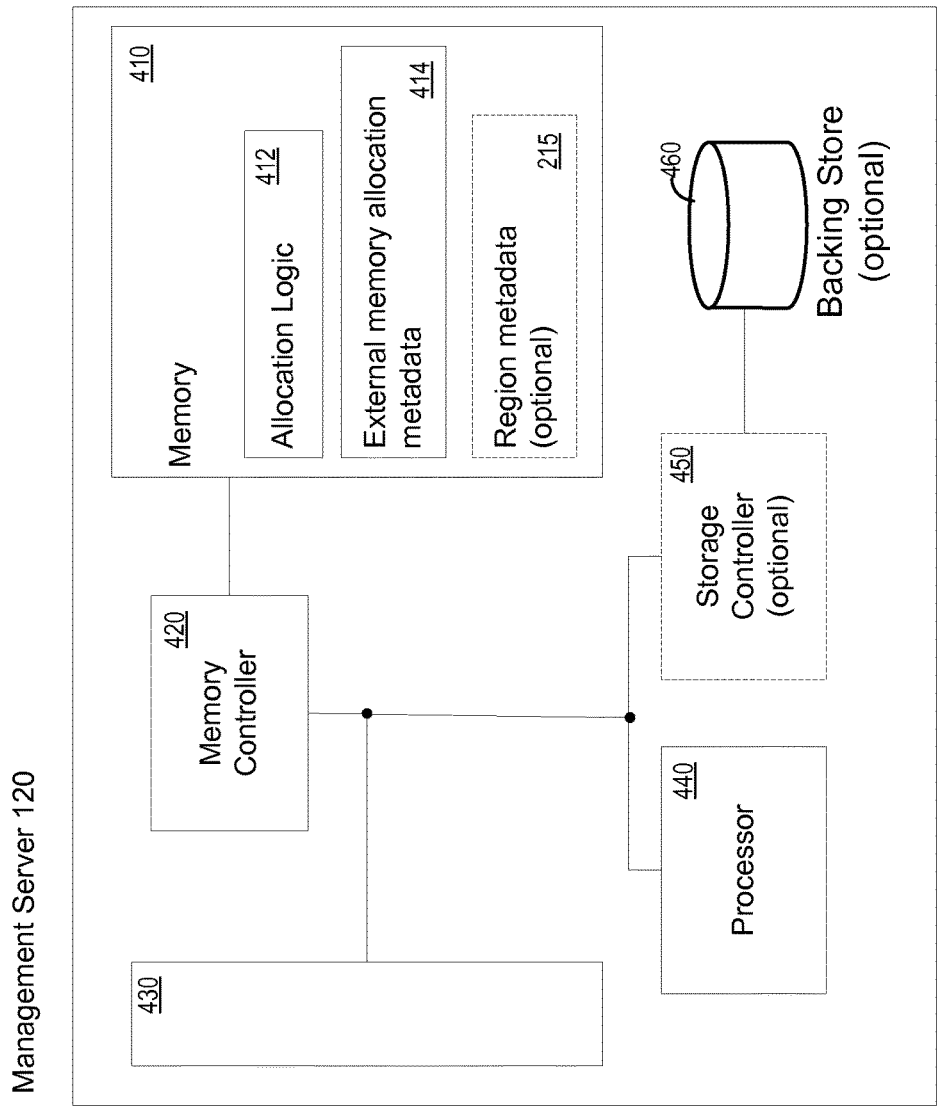
FIG. 4 illustrates an example management server.

FIG. 4 illustrates the example management server 120. The management server 120 may include a memory 410, a processor 440, a communication interface 430, and a memory controller 420, similar to the memory 210, the processor 240, the communication interface 230, and the memory controller 220 of the memory appliance 110. The management server 120 may include more, fewer, or different components. For example, the management server may include a storage controller 450, a backing store 460, multiple storage controllers, multiple backing stores, multiple memories, multiple memory controllers, multiple processors, or any combination thereof. Alternatively, the management server 120 may just include a process executed by the processor 440.

The storage controller 450 and/or backing store 460 of the management server 120 may be internal to the management server 120, a physically discrete device external to the management server 120 that is coupled to the management server 120, included in a second management server or in a device different from the management server 120, included in the client 130, included in the memory appliance 110, part of a server, part of a backup device, part of a storage device on a Storage Area Network, and/or part of some other externally attached persistent storage. Alternatively, or in addition, the region 214 included in the memory appliance 110 may be used as the backing store 460 for the management server 120.

The memory 410 of the management server 120 may include an allocation logic 412 and/or external memory allocation metadata 414. The memory 410 of the management server 120 may include more, fewer, or different components. For example, the memory 410 of the management server 120 may include region metadata 215. The processor 440 may execute computer executable instructions that are included in the allocation logic 412. The allocation logic 412 may be referred to as an allocation logic unit. The components of the management server 120 may be in communication with each other over an interconnect 470, such as the interconnect 270 in the memory appliance 110 or over any other type of interconnect.

During operation of the external memory system, the region access logic 212 may provide the client 130 and/or management server 120 with client-side memory access to the region 214. Alternatively, or in addition, the region access logic 212 may provide other memory appliances with client-side memory access to the region 214. Client-side memory access may include a memory access operation. A memory access operation may include, for example, a read memory operation or a write memory operation. The memory access operation may be performed by the memory appliance 110 in response to receiving a request from the client 130 and/or management server 120 at the communication interface 230 of the memory appliance 110. The request may include, for example, a starting memory offset, a size of memory allocation, a starting memory location, a number of units of memory to access, or any other attribute relating to the requested memory access operation. The request may address the memory 210 on a block-addressable basis, a word-addressable basis, a byte-addressable basis, or on any other suitable unit of memory basis.

The region access logic 212 may register the region 214 with the communication interface 230 and/or with a device other than the memory appliance, such as with the client 130 and/or management server 120. Alternatively or in addition, the region access logic 212 may determine a location or locations in the memory 210 of the memory appliance 110 where the region 214 is located. The region access logic 212 may register the location or locations with the communication interface 230 and/or with a device other than the memory appliance 110, such as with the client 130 and/or management server 120.

The region access logic 212 may control and/or specify how the region 214 may be accessed. For example, the region access logic 212 may control which regions are available on the memory appliance 110 and/or which operations may be performed. In one example, the region access logic 212 may control access based upon the current time, day, month or year; an identity or a location of the communication interface, an identity or a location of the client and/or management server; or some other attribute of the client 130, the memory appliance 110, the management server 120, the interconnect 140, or of the surrounding environment that is detectable by the region access logic 212, such as the condition of the power source that powers the memory appliance 110. Alternatively or in addition, the region access logic 212 may control access based on an authentication mechanism, including but not limited to a password, a key, biometrics, or a cryptographic authentication.

The region access logic 212 or the communication interface 230 may provide client-side memory access using any memory access protocol now known or later discovered. The memory access protocol may be any communication protocol used to transfer data between a memory in a first device, such as the memory 310 in the client 130, and a memory in a second device, such as the memory 210 in the memory appliance 110, where the data is transferred independently of CPU's in the first and second devices, such as the processor 340 in the client 130 and the processor 240 in the memory appliance 110. Therefore, in examples where the first device includes an operating system, the data may be transferred from the memory of the first device to the memory of the second device without involvement of the operating system. Although instructions executed by the CPU may direct a hardware data controller to transfer the data from the memory of the first device to the memory of the second device, the actual transfer of the data between the memories may be completed without involvement of the CPU and, if the first device includes an operating system, without involvement of the operating system. The memory access protocol may describe, for example, a format of the request for the memory access operation to be performed on the memory in the second device or system.

The memory access protocol may be implemented, for example, using one or more hardware controllers, such as the communication interface 230 in the memory appliance 110 and the communication interface 330 in the client 130. The memory access protocol and electrical characteristics of the hardware controller may be part of a common standard. Accordingly, the memory access protocol and electrical characteristics of the communication interfaces may be part of one standard. In one example, the access protocol may be the RDMA protocol implemented in the communication interfaces, where the memory access protocol and the communication interfaces conform to an InfiniBand standard. In a second example, the memory access protocol may be Internet Wide Area RDMA Protocol (iWARP), where iWARP is implemented in the communication interfaces, and where the communication interfaces conform to an iWARP standard. The iWARP standard, which is an Internet Engineering Task Force (IETF) protocol, is RDMA over TCP (Transport Control Protocol). In a third example, the memory access protocol may be RDMA over Converged Ethernet (RoCE), where RoCE is implemented in the communication interfaces, and where the communication interfaces conform to RoCE and Ethernet standards. In a third example, the memory access protocol may be a PCI bus-mastering protocol implemented in the communication interfaces, where the communication interfaces conform to a PCI standard. The memory access protocol, such as RDMA, may be layered directly over a transport protocol, such as TCP.

The region access logic 212, the client logic 312, and/or the allocation logic 412 may utilize multiple communication interfaces to provide resiliency against various communication failure modes. Communication failure modes may include failure of one or more communication interfaces, failure of one or more ports included in one or more communication interfaces, failure of a portion of the interconnect, such as an interconnect cable or interconnection fabric switch, and/or any other failure that may sever a network link between any two communication interfaces. The region access logic 212 may provide resiliency against communication failure modes using features of the communication interfaces. In a first example, the region access logic 212 may configure the communication interfaces to use an alternate path if a primary path experiences interconnect errors, such as using InfiniBand Automatic Path Migration. In a second example, the region access logic 212 may provide resiliency against communication failure modes by choosing communication modes that are by design resilient against interconnect errors, such as InfiniBand reliable connections, TCP connections, etc. Alternatively, or in addition, the region access logic 212 may provide resiliency against communication failure modes by establishing multiple active network links, and using one or more of the non-failing network links to provide connectivity. The multiple active network links may be selected to optimize redundancy versus failures. For example, the multiple network links may utilize different ports on different communication interfaces, such that a failure of one port or one communication interface may only cause one of the multiple active network links to fail.

In one or more examples, the region access logic 212 may additionally provide block-level access to the region 214 using any storage protocol now known or later discovered. A storage protocol may be any communications protocol used to transfer data between a block storage device or system, such as the memory appliance 110, and a device or system, such as the client 130, that stores data in, and/or retrieves data from, the block storage device or system. A storage protocol may be implemented, for example, using one or more software and/or hardware storage controllers. The storage protocol and electrical characteristics of the hardware storage controller may be part of a common standard. In one example, the storage protocol may be the universal serial bus mass storage device class (USB MSC or UMS), which is a set of computing communications protocols defined by the USB Implementers Forum that runs on a hardware bus, such as the interconnect, that conforms to the USB standard. In a second example, the storage protocol may be the SCSI command protocol. In a third example, the storage protocol may be the SATA protocol. Additional examples of the storage protocol include Serial Attached SCSI (SAS) and Internet Small Computer System Interface (iSCSI). Alternatively or in addition, the region access logic 212 may provide block-level access using any storage protocol that transfers data with a data transfer protocol, such as SCSI over Fibre Channel, SCSI RDMA Protocol (SRP) over Remote Direct Memory Access (RDMA), iSCSI over TCP/IP, or any other combination of storage protocol and data transfer protocol known now or discovered in the future.

Accessing the region 214 using the storage protocol may be slower than accessing the region 214 using the memory access protocol. In contrast to the memory access protocol, the processor 340 of the client 130 may interact with the storage controller 350 during the transfer of data to the block storage device 360 or system, where the storage controller implements the storage protocol. Therefore, the storage protocol is different from the memory access protocol.

By providing block-addressable client-side memory access and/or block-level access through the region access logic 212, the memory appliance 110 may be considered, in an example implementation, a block storage device. A block storage device may also be referred to as a block device. A block device stores data in blocks of a predetermined size, such as 512 or 1024 bytes. The predetermined size may be configurable. A block device is accessed via a software and/or hardware storage controller and/or a communication interface, such as the communication interface 230. Examples of other block devices include a disk drive having a spinning disk, a tape drive, a floppy disk drive, and a USB flash pen drive.

The region access logic 212 may subdivide the memory 210, and/or the backing store 260 into one or more regions. Each one of the regions, such as the region 214 in the memory 210 of the memory appliance 110, may be a configured area of storage that is accessible via any access protocol and/or storage protocol. Access protocols and storage protocols are described elsewhere in this disclosure.

The backing store 260 may include any block device. Examples of block devices include, but are not limited to, hard disks, CD-ROM drives, tape drives, solid state storage devices, flash drives, or any other mass storage device.

The client logic 312 and/or the allocation logic 412 may perform memory access operations on the region 214 in the memory 210 of the memory appliance 110 using client-side memory access over the memory access protocol. Alternatively or in addition, the client logic 312 and/or the allocation logic 412 may perform operations to discover the memory appliance 110 when connected, or to discover available regions that may be accessible on the memory appliance 110. Alternatively or in addition, the client logic 312 and/or the allocation logic 412 may perform administration operations to modify attributes or metadata, such as the region metadata 215, associated with the region 214. The operations may include sending region access logic requests, described elsewhere in this disclosure. In an example, the client logic 312 and/or the allocation logic 412 may perform an administration operation to set a human readable label associated with the region 214. In an example, the client logic 312 and/or the allocation logic 412 may perform an administration operation to change the operations that are available to the client 130 and/or to other clients. The administration operations may be used, for example, to coordinate shared access to the region by multiple clients.

The client logic 312 and/or the allocation logic 412 may perform operations that communicate information to the observer logic 218 about a set of one or more memory access operations that were requested or that are to be requested by the client logic 312 and/or the allocation logic 412. For example, the client logic 312 and/or the allocation logic 412 may transmit a notification message via the communication interface 330 of the client 130 and/or the communication interface 430 of the management server 120. The observer logic 218 may receive the notification message via the communication interface 230 of the memory appliance 110. The notification message may precede or follow the set of memory access operations requested by the client logic 312 and/or the allocation logic 412. The notification message may identify attributes of the set of memory access operations.

Alternatively or in addition, the client logic 312 and/or the allocation logic 412 may perform memory access operations that are directly observable or identified by the observer logic 218. For example, the request to perform the memory access operation may include notification information, such as an RDMA write with immediate value operation. In addition to writing to the memory in the region 214, the write with immediate value operation may cause the observer logic 218 to receive a notification that includes the immediate value specified by the client logic 312 and/or the allocation logic 412 in the RDMA write with immediate value operation. The value may include one or more attributes of the memory access operation. For example, the value may indicate what portion of the memory 210 is written to during the RDMA write with immediate value operation. Alternatively or in addition, the client logic 212 and/or the allocation logic 412 may perform operations that create a condition at the memory appliance 110 that the observer logic 218 may check for. For example, the client logic 312 and/or the allocation logic 412 may perform a client-side memory access operation to store information about a set of memory access operations in a particular portion of the memory on the memory appliance 110. The information stored in the portion may include, for example, the offset, size, and/or type of each memory access operation performed. The observer logic may check the portion for updates in order to identify one or more attributes of the memory access operations.

The observer logic 218 may observe or otherwise identify the operations requested by the client logic 312 and/or the allocation logic 412 that are performed on the region 214 and/or the memory appliance 110. The observer logic 218 may identify the requested operations based on direct communication between the memory appliance 110 and any of: the client 130, the management server 120, and/or another memory appliance. For example, the observer logic 218 may listen for incoming notification messages at the communication interface 230. Alternatively, or in addition, the observer logic 218 may passively monitor the operations requested by the client logic 312 and/or the allocation logic 412. For example, the observer logic 218 may listen for notification messages received as a result of operations performed by the client logic 312 and/or the allocation logic 412.

Alternatively, or in addition, the observer logic may check for conditions created by the client logic 312, the allocation logic 412, the communication interfaces, or another hardware component. For example, the observer logic 218 may read contents of one or more portions of the memory 210 that are accessible by the client 130 and/or the management server 120 using client-side memory access, by the communication interfaces, or by another hardware component. In an example, a first portion of the memory 210 may include one or more flags that indicate whether one or more second portions of the memory 210 have been updated by the memory access operations since the one or more second portions of the memory 210 were last copied to the backing store 260. In a second example, a first portion of the memory 210 may include one or more flags that indicate whether one or more second portions of the memory 210 have been read or written by the memory access operations since the last time the flags have been checked by the observer logic 218. In a third example, a first portion of the memory 210 may include one or more values that indicate how many times one or more second portions of the memory 210 have been read or written by the memory access operations since the last time the values have been checked by the observer logic 218.

In response to identifying a set of memory access operations, the observer logic 218 may take further action. In an example, further action may include determining statistics related to the memory access operations (including but not limited to the type of operation, the number of operations, the size of the affected memory, and/or memory locations of each operation). In a second example, further action may include tracking or identifying regions of the memory 210 that have been written to or otherwise affected by the memory access operations. The observer logic 218 may persist the contents of the affected regions of the memory 210 to the backing store 260, backing stores, and/or duplicate the contents of the affected regions of the memory 210 to another memory appliance, a block device, an external server, and/or a backup device. Alternatively, the observer logic 218 may take any other action related to the memory access operations.

The memory access operation may complete at the memory appliance 110 without waiting for the observer logic 218 to identify the memory access operation. Alternatively or in addition, the memory access operation may complete at the memory appliance 110 without waiting for the observer logic 218 to take any further action in response to identifying the memory access operation. Accordingly, the client logic 312 and/or the allocation logic 412 may perform a write operation to the region 214 in the amount of time that the request to perform the write operation travels over the interconnect 140 and the memory appliance 110 writes data to the memory. The overhead associated with storage protocols and/or writing the data to the backing store 260 may be avoided.

Mechanisms for observing or identifying the operations requested by the client logic 312 and/or the allocation logic 412 and the actions taken in response to identifying the operations may take any of numerous forms. A particular mechanism may balance tradeoffs between individual operation latency, operations per second from an individual client and/or management server, aggregate operations per second from multiple clients and/or management servers, demand placed upon compute resources of the clients, demand placed on compute resources of the management servers, and demand placed on compute resources of the memory appliance or on the observer logic, among others.

Alternatively or in addition the observer logic 218 may not observe or identify the memory access operations performed. Alternatively or in addition, the observer logic 218 may take one or more actions without specific knowledge of the memory access operations. For example, the observer logic 218 may persist the entire contents of the region 214 to the backing store 260; duplicate the entire contents of the region 214 to another storage device, external server, and/or backup device; and/or take some other action related to the region 214. Alternatively or in addition, the observer logic 218 may compare the contents of the region 214 with the contents of the backing store 260. Alternatively or in addition, the observer logic 218 may use computed hash values to determine which areas of the region 214 have been modified. A computed hash value may be a computed output which is expected with high probability to have a different value for two different input buffers and which may be smaller than one or both input buffers. Examples of computed hash values include checksums, cyclic redundancy check codes, and cryptographic hash codes. The observer logic 218 may perform actions without knowledge of the memory access operations periodically, prior to system shutdown, according to a schedule, or in response to a particular event, such as a hardware interrupt.

Alternatively, a client-side memory access may be performed as described throughout this disclosure, and then the client logic 312 may choose to wait for an additional notification from the observer logic 218 that the further actions are complete. For example, the client-side memory access may be a first client-side memory access, and the further actions may include replicating data from the affected regions to one or more additional memory appliances using additional client-side memory accesses between the memory appliances. Waiting for the additional notification for the first client-side memory access provides assurance to the client logic 312 that the affected regions have been synchronized between the multiple memory appliances. If an application is performing activities that may benefit from this assurance, it may be beneficial to wait for the additional notification. While waiting for the additional notification does increase the overall latency of the first client-side memory access by the time it takes for the observer logic 218 to be notified and replicate the affected regions and the time it takes to receive the additional notification, the client logic 312 still does not need to wait for the observer logic 218 of the additional memory appliances to be notified or take any action.

The application logic, the client logic 312, and/or the allocation logic 412 may perform data translation on the data being read and/or written to the region 214. Alternatively, or in addition, the communication interfaces, the memory controllers, the storage controllers, and/or the backing stores may perform data translation. Data translation may include manipulating the data being read and/or written.

In a first example, the application logic, the client logic, the allocation logic, the communication interfaces, the memory controllers, the storage controllers, and/or the backing stores may compress the data being written to the region 214 and/or decompress the data being read from the region 214. Compression and/or decompression may be performed using any one or more compression schemes, such as Lempel-Ziv (LZ), DEFLATE, Lempel-Ziv-Welch (LZW), Lempel-Ziv-Renau (LZR), Lempel-Ziv-Oberhumer (LZO), Huffman encoding, LZX, LZ77, Prediction by Partial Matching (PPM), Burrows-Wheeler transform (BWT), Sequitur, Re-Pair, arithmetic code, and/or other scheme which may be used to recoverably reduce the size of data.

In a second example, the application logic, the client logic, the allocation logic, the communication interfaces, the memory controllers, the storage controllers, and/or the backing stores may encrypt the data being written to the region 214 and/or decrypt the data being read from the region 214. Encryption and/or decryption may be performed using any one or more encryption schemes and/or ciphers, such as symmetric encryption, public-key encryption, block ciphers, stream ciphers, substitution ciphers, transposition ciphers, and/or any other scheme which may be used to encode information such that only authorized parties may decode it. One or more encryption keys for the one or more encryption schemes may be included in the access parameters for the region 214.

In a third example, the application logic, the client logic, the allocation logic, the communication interfaces, the memory controllers, the storage controllers, and/or the backing stores may perform error detection and/or error correction upon the data being written to the region 214 and/or the data being read from the region 214. Error detection and/or error correction may be performed using any one or more error detection and/or error correction schemes, such as repetition codes, parity bits, checksums, cyclic redundancy checks, cryptographic hash functions, error correcting codes, forward error correction, convolutional codes, block codes, Hamming codes, Reed-Solomon codes, Turbo codes, low-density parity-check codes (LDPC), and/or any other scheme which may be used to detect and/or correct data errors.

The application logic 314, the client logic 312, and/or the allocation logic 412 may perform data monitoring on the data being read and/or written to the region 214. Alternatively, or in addition, the communication interfaces, the memory controllers, the storage controllers, and/or the backing stores may perform data monitoring. Data monitoring may include observing the data being read and/or written. In an example, the application logic, the client logic, the allocation logic, the communication interfaces, the memory controllers, the storage controllers, and/or the backing stores may perform virus scanning on data being read from and/or written to the region 214. In a second example, the application logic, the client logic, the allocation logic, the communication interfaces, the memory controllers, the storage controllers, and/or the backing stores may perform malware detection on data being read from and/or written to the region 214. In a third example, the application logic, the client logic, the allocation logic, the communication interfaces, the memory controllers, the storage controllers, and/or the backing stores may perform policy enforcement, such as monitoring for forbidden data patterns and/or strings, on data being read from and/or written to the region 214. In a fourth example, the application logic, the client logic, the allocation logic, the communication interfaces, the memory controllers, the storage controllers, and/or the backing stores may perform data indexing on data being read from and/or written to the region 214. For example an index for a first region may be created in a second region, the index providing fast lookup of data in the first region.

Presence of management servers, memory appliances, and/or clients may be detected automatically by the allocation logic 412, the region access logic 212, and/or the client logic 312. When the management server 120, the memory appliance 110, and/or the client 130 is detected by the allocation logic 412, the region access logic 212, and/or the client logic 312, it may become known to the allocation logic 412, the region access logic 212, and/or the client logic 312 that detected it. To facilitate being detected, the allocation logic 412, the region access logic 212, and/or the client logic 312 may transmit a hello message upon one or more interconnects 140 upon startup, periodically, and/or upon receiving a presence detection request message. Upon receiving a hello message, the allocation logic 412, the region access logic 212, and/or the client logic 312 may detect the management server 120, the memory appliance 110, and/or the client 130 that sent the hello message. To facilitate detecting management servers, memory appliances, and/or clients, the allocation logic 412, the region access logic 212, and/or the client logic 312 may send a presence detection request message. A presence detection request message may include information about the characteristics or configurations of the management servers and/or memory appliances including the allocation logic 412 and/or region access logic 212 that may respond. Alternatively or in addition, a presence detection request message may include an indication of whether only management servers, only memory appliances, only clients, or some combination of these may respond.

Alternatively, or in addition, the allocation logic 412, the region access logic 212, and/or the client logic 312 may register the presence of the corresponding management servers, memory appliances, and/or clients with one or more registration servers. A registration server may be an Infini-Band subnet administrator, a Domain Name System (DNS) server, a Multicast DNS (mDNS) server, Service Location Protocol (SLP) directory agent, an Active Directory Server, or any other server capable of receiving and/or distributing information about management servers, memory appliances, and/or clients. Alternatively, or in addition, the allocation logic 412, the region access logic 212, and/or the client logic 312 may include information about the characteristics and/or configuration of the corresponding management servers, memory appliances, and/or clients when registering their presence with the registration server. The allocation logic 412, the region access logic 212, and/or the client logic 312 may detect management servers, memory appliances, and/or clients by querying the one or more registration servers.

Alternatively, or in addition, presence of management servers and/or memory appliances may be specified by an administrator using a user interface. The user interface may be a graphical user interface, a web interface, a command-line interface, an application programming interface (API), and/or any other type of interface or combination of interfaces known now or later discovered.

Management servers may be associated with one or more memory appliances. Memory appliances may be associated with one or more management servers. Management servers may additionally be associated with zero or more other management servers. For example, the management server 120 may be associated with another management server that may function as a backup management server in case the management server 120 fails. The backup management server may maintain copies of data of the management server 120, including, but not limited to, the external memory allocation metadata 414 and/or the region metadata 215. The backup management server may further have a copy of the backing store 460 of the management server 120. The backup management server may obtain such copies of data at a predetermined schedule. Alternatively, or in addition, the backup management server may obtain a copy of the data in response to an event, such as modification of the data of the management server 120. Alternatively, or in addition, the backup management server may obtain a copy of the data from the management server 120 in response to a request from an administrator, such as via the user interface. The backup management server 120 may obtain data of the management server 120 as described elsewhere in this disclosure.

Associations between management servers and memory appliances may be specified by an administrator using a second user interface, which may be part of the user interface described earlier. The second user interface may be a graphical user interface, a web interface, a command-line interface, an API, and/or any other type of interface or combination of interfaces known now or later discovered.

The memories of the memory appliances associated with the management server 120 may be part of a memory pool. Alternatively, or in addition, the memories of the memory appliances known to the allocation logic 412 of the management server 120 may be part of the memory pool. Alternatively, or in addition, the memories of the memory appliances associated with multiple management servers and/or known to multiple allocation logics may be part of the memory pool. The pool of memory, or the memory pool, may be a collection of allocatable memory that spans one or more memory appliances.

Alternatively, or in addition, associations between management servers and memory appliances may be determined automatically. Automatic associations between management servers and memory appliances may be determined based upon characteristics or configurations of the management servers, the memory appliances, or both. Characteristics or configurations of the management server 120, the memory appliance 110, and/or the client 130 may include hardware revisions, firmware revisions, software revisions, protocol revisions, physical location, logical location, network location, network topology, network bandwidth, network capacity, network utilization, logical grouping, labels, names, server/appliance health, server/appliance utilization, server/appliance overall performance rating, processor type, number of processors, processor speed, memory bandwidth, memory capacity, memory utilization, memory health, backing store presence, backing store bandwidth, backing store input/output operations per second (IOPS), backing store latency, backing store capacity, backing store utilization, backing store health, battery presence, battery type, battery chemistry, battery capacity, battery utilization, battery % charged, battery time remaining, battery health, or any other characteristic or combination of characteristics of the management server 120, the memory appliance 110, and/or the client 130. In an example, the allocation logic 412 may automatically associate the management server 120 with memory appliances in the same physical rack. In another example, the allocation logic 412 may automatically associate the management server 120 with memory appliances sharing the same protocol version. In another example, the allocation logic 412 may automatically associate the management server 120 with memory appliances with appliance health, memory health, backing store health, and/or battery health above or below a threshold or set of thresholds. The thresholds may be configurable by the administrator via the user interface, or may be predetermined when the management server starts up.

The allocation logic 412 may transmit region access logic requests to the region access logic 212 included in one or more memory appliances. The memory appliances including the region access logic 212 to which the requests are sent may be associated with the management servers including the allocation logic 412 and/or known by the allocation logic 412. For example, region access logic requests received by the region access logic 212 may include requests to create the region 214, requests to resize the existing region 214, requests to restore contents of the region 214 from the backing store 260, requests to get the status of the memory 210 included in the memory appliance 110, requests to get health status from the memory appliance 110, requests to persist the region 214 to the backing store 260 and remove the region 214 from the memory 210, requests to destroy the region 214, requests to get a list of available regions, requests to get information for the region 214, requests to modify settings for the region 214, requests to migrate the region 214, and/or any other request related to the memory appliance 110 and/or the regions included in the memory 210 of the memory appliance 110.

The region access logic requests may be communicated over any communications protocol and/or interface capable of carrying messages. For example, the region access logic requests may be carried over UDP datagrams, a TCP connection, an SSL connection, InfiniBand reliable connections, RoCE, iWARP, HTTP, or any other communications protocol known now or later discovered. Alternatively, or in addition, the region access logic requests may be carried over remote procedure calls, such as using XML-RPC, SOAP, CORBA, Java Remote Method Invocation (Java RMI), and/or any other remote procedure call protocol. Alternatively, or in addition, the region access logic requests may be carried over a communication protocol based on client-side memory access, such as by writing messages into a buffer on the memory appliance 110 via client-side-memory access. Alternatively, or in addition, the region access logic requests may be carried via invoking methods in an API. For example, if the allocation logic 412 and region access logic 212 are co-located or combined, the region access logic requests may be methods in an API. The allocation logic 412 and region access logic 212 may be co-located in examples where the memory appliance 110 also functions as the management server 120, or, alternatively, the management server 120 also functions as the memory appliance 110.

Upon receiving a request to create the region 214, the region access logic 212 may allocate a portion of the memory 210 included in the memory appliance 110 for the region 214. Allocating a portion of the memory 210 may include initializing the contents of the allocated memory. Alternatively, or in addition, the memory being allocated may be pre-initialized, such as by an operating system. Alternatively, or in addition, the memory being allocated may be partially pre-allocated, such as a free list including one or more portions of pre-allocated and/or pre-initialized memory. Alternatively, or in addition, the region access logic 212 may configure the communication interface 230 for the region 214 without allocating the entire portion of the memory for the region 214 and/or without initializing the contents of the memory. The region access logic 212 may configure the communication interface 230 to treat unallocated and/or un-initialized portions as not present. Attempting to access data that is not present using client-side memory access may fail. Alternatively, or in addition, attempting to access data that is not present using client-side memory access may cause the processor 240 to be notified. Upon being notified, the processor 240 may take some action related to the attempt to access data that is not present, such as allocating a portion of the memory 210 to satisfy the attempt to access data that is not present and/or initializing the portion of the memory. The region access logic 212 may also associate an identifier with the region 214. The identifier may be chosen by the region access logic 212 or it may be included in the request to create the region 214. Additionally, the region access logic 212 may associate metadata with the region 214. The region access logic 212 may respond to the request to create the region 214 with a response message. The response message may include the identifier associated with the region 214 and/or a status, indicating whether the operation was successful.

Upon receiving a request to resize the existing region 214, if the region 214 is being expanded, the region access logic 212 may allocate a portion of the memory 210 of the memory appliance 110. Allocating a portion of the memory 210 may include initializing the contents of the allocated memory. Alternatively, or in addition, the memory being allocated may be pre-initialized, such as by an operating system. Alternatively, or in addition, the memory being allocated may be partially pre-allocated, such as a free list including one or more portions of pre-allocated and/or pre-initialized memory. The size of the portion of the memory may be related to the size of the expanded region minus the size of the existing region 214. For example, the size of the portion of the memory may be the size of the expanded region minus the size of the existing region 214 rounded up to the nearest unit of allocation, such as a page, a huge page, a slab, and/or any other unit of allocation. The units of allocation may have respective predetermined sizes. The predetermined sizes may vary, such as based on an operating system being used by the client 130, the memory appliance 110, and/or the management server 120. Alternatively, or in addition, the size of the portion of the memory may be specified by the request to resize the existing region 214. Alternatively, or in addition, the request to resize the existing region 214 may specify an offset within the region 214 where the allocated portion may appear. For example, the request to resize the existing region 214 may be re-allocating a portion of the region 214 that was previously de-allocated by a different request to resize the same region 214. The region access logic 212 may assign the allocated portion to the region 214. The region access logic 212 may update the region metadata 215 to include references to the allocated portion of the memory 210.

Upon receiving the request to resize the existing region 214, if the region 214 is being contracted, the region access logic 212 may update the region metadata 215 to remove references to a portion of the memory allocated to the region 214 and/or may de-allocate the portion of the memory. De-allocating may include listing the de-allocated portions on the free list. The portion of the memory may be the portion at the logical end of the region 214, at the logical beginning of the region 214, and/or at any other logical location within the region 214. The portion of the region to be removed may be specified by the request to resize the existing region 214. For example, the request to resize the existing region 214 may specify that the data at the end of the region 214 may be discarded. Alternatively, or in addition, the request to resize the existing region 214 may specify that the data at the beginning of the region 214 may be discarded. Discarding data at a location other than the end of the region 214 may cause the offsets of data after the discarded data to change. For example, removing 100 MiB (mebibyte) from the region starting at an offset of 200 MiB may cause data that previously occurred at an offset of 300 MiB to instead occur at an offset of 100 MiB. Alternatively, discarding data at a location other than the end of the region 214 may cause the offsets of data after the discarded data to stay the same. The region access logic 212 may configure the communication interface 230 to treat the discarded data as not-present. Attempting to access data that is not present using client-side memory access may fail. Alternatively, attempting to access data that is not present using client-side memory access may cause the processor 240 to be notified. Upon being notified, the processor 240 may take some action related to the attempt to access data that is not present, such as allocating a portion of the memory and/or initializing the portion to satisfy the attempt to access the data that is not present.

Upon receiving a request to restore the contents of the region 214 from the backing store 260, the region access logic 212 may allocate a portion of the memory 210 included in the memory appliance 110 for the region 214. The region access logic 212 may copy the contents of persisted data related to the region 214 into the allocated memory. Alternatively, or in addition, the region access logic 212 may associate portions of the backing store 260 with portions of the region 214 without immediately allocating the portion of the memory and/or without immediately copying the contents by configuring the communication interface 230 to treat the portions of the region 214 as not present. Attempting to access data that is not present using client-side memory access may fail. Alternatively, attempting to access data that is not present using client-side memory access may cause the processor 240 to be notified. Upon being notified, the processor 240 may take some action related to the attempt to access data that is not present, such as allocating a portion of the memory to satisfy the attempt to access data that is not present, initializing the portion of the memory, and/or copying the contents of persisted data related to the portion into the portion. The region access logic 212 may respond to the request to restore the contents of the region 214 from the backing store 260 with a response message. The response message may include the identifier associated with the region 214 and/or a status, indicating whether the operation was successful.

Upon receiving a request to get the status of the memory 210 included in the memory appliance 110, the region access logic 212 may respond to the request with a response message. The response message may include one or more attributes of the memory 210 included in the memory appliance 110. The attributes may include the total memory available to hold regions, the amount of memory currently in use by existing regions, the amount of memory available to hold additional regions, and/or any other attributes of the memory 210 included in the memory appliance 110.

Upon receiving a request to get health status from the memory appliance 110, the region access logic 212 may respond to the request with a response message. The response message may include one or more attributes describing the health of the memory appliance 110, of components included in the memory appliance 110, and/or of components connected to the memory appliance 110. Examples of health that may be described by the attributes include temperatures, voltages, cooling system health, backing store status, memory health, CPU health, battery capacity, projected battery run time, or any other hardware, firmware, or software status and/or health relevant to the health of the memory appliance 110. Temperatures may include CPU temperatures, integrated circuit temperatures, circuit board temperatures, chassis intake temperatures, chassis output temperatures, power supply temperatures, uninterruptible power supply (UPS) temperatures, battery temperatures, backing store temperatures, and/or any other temperatures relevant to the health of the memory appliance 110. Voltages may include CPU voltages, integrated circuit voltages, circuit board voltages, power supply input voltages, power supply output voltages, UPS input voltages, UPS output voltages, battery voltages, and/or any other voltages relevant to the health of the memory appliance 110. Cooling system health may include fan speeds, liquid coolant temperatures, liquid coolant flow rates, facility cooling health, and/or any other status related to the ability to maintain stable temperatures. Backing store status may include status of individual storage devices included in the backing store, status of hardware and/or software storage controllers, status of logical volumes included in the storage devices, status of logical associations between storage devices, status of logical associations between logical volumes, and/or any other status related to the ability to reliably store data in the backing store 260. Logical associations may include software or hardware mechanisms used to aggregate storage devices or logical volumes and/or to provide redundancy and/or resiliency. For example, a logical association may be a redundant array of independent disks (RAID). Memory health may include number and/or source of memory errors, memory redundancy status, and/or any other status related to the ability to reliably store data in the memory. Memory errors may include recoverable error correcting code (ECC) errors, unrecoverable ECC errors, rank spared indications, mirror broken indications, and/or any other errors and/or indications reported by the memory and/or memory controller. CPU health may include CPU errors, CPU voltage/frequency scaling mode, and/or any other status related to the CPU's ability to reliably execute instructions. CPU errors may include hardware watchdog expirations, machine checks, cache ECC errors, processor faults, and/or any other error or indication reported by the CPU and/or CPU monitoring hardware.

Upon receiving a request to persist the region 214 to the backing store 260 and remove it from memory 210, the region access logic 212 may copy the contents of the region 214 to a portion of the backing store 260. The portion of the backing store 260 may be determined at the time the request to persist the region 214 to the backing store 260 and remove it from the memory 210 is received. Alternatively, the portion may have been determined in advance, such as when the region 214 was created, and/or when the region 214 was configured. After the contents of the region 214 are copied to the portion of the backing store 260, the region access logic 212 may de-allocate the portion of the memory included in the memory appliance 110 for the region 214. De-allocating may include listing the de-allocated portions on a free list, which indicates portions of the memory 210 that have not been allocated to any particular region. Alternatively, or in addition, as the contents of portions of the region 214 are copied to the backing store 260, the region access logic 212 may selectively de-allocate the portions of the region 214 that have already been copied to the backing store 260. Alternatively or in addition, if portions of the region 214 have already been copied to the backing store 260 prior to receiving the request to persist the region 214 to the backing store 260 and remove it from memory 210, the region access logic 212 may not copy the portions of the region 214 that have already been copied to the backing store 260. The region access logic 212 may respond to the request to persist the region to the backing store 260 and remove it from memory 210 with a response message. The response message may include the identifier associated with the region 210 and/or a status, indicating whether the operation was successful.

Upon receiving a request to destroy the region 214, the region access logic 212 may de-allocate the portion of the memory included in the memory appliance 110 for the region 214. De-allocating may include listing the de-allocated portions on the free list. Alternatively, or in addition, the region access logic 212 may delete any persisted data related to the region 214 included in the backing store 260. The region access logic 212 may respond to the request to destroy the region 214 with a response message. The response message may include the identifier associated with the region 214 and/or a status, indicating whether the operation was successful.

Upon receiving a request to get a list of available regions, the region access logic 212 may respond to the request with a response message. The response message may include a number of available regions and/or attributes related to the available regions. Available regions may include regions that are included in the memory 210, regions that are included in the backing store 260, and/or regions that are partially included in the memory 210 and/or backing store 260. The attributes related to an available region, such as the region 214, may include the identifier associated with the region, the size of the region, the status of the region, information about external memory allocations that reference the region, and/or any other information related to the region. The status of the region 214 may include one or more indications of whether the region is included in the memory 210, whether the region 214 is included in the backing store 260, whether the contents of the region 214 are being persisted to the backing store 260, whether the contents of the region 214 are being restored from the backing store 260, and/or whether the contents of the region 214 are being transferred to or from another memory appliance or storage device. Information about an external memory allocation may include an identifier for the external memory allocation, information about the external memory allocation, and/or information about the region's role in the external memory allocation. For example, an external memory allocation may include metadata describing a logical relationship between the regions referenced by the external memory allocation. In one example, the logical relationship could be a concatenation of regions located in different memory appliances, the metadata describing the logical relationship may include an indication that concatenation is in use and/or a logical address within the external memory allocation at which the region's data logically exists. Alternatively, or in addition, the logical relationship could be a striping relationship, such as RAID-0; a mirroring relationship, such as RAID-1; a parity relationship, such as RAID-2, RAID-3, RAID-4, RAID-5, or RAID-6; a partial data redundancy relationship, a combination of relationships, such as striping with mirroring; or any other relationship between regions known now or later discovered.

Upon receipt of a request to get information for the region 214, the region access logic 212 may respond to the request with a response message. The response message may include information related to the region 214. The information related to the region 214 may include all of or a portion of the region metadata 215. Alternatively, or in addition, the information related to the region 214 may be derived from the region metadata 215. Alternatively, or in addition, the information related to the region 214 may be different depending upon parameters included in the request to get information for the region 214. For example, the parameters may include an indication of which portion of the metadata 215 may be included in the information related to the region 214.

Upon receiving a request to modify settings for the region 214, the region access logic 212 may update the region metadata 215 to reflect the modified settings. For example, the request to modify settings for the region 214 may set a human readable label to be associated with the region 214, modify access parameters, and/or modify other portions of the region metadata 215. The region access logic 212 may restrict which parts of the region metadata 215 may be modified. For example, the region access logic 212 may use the access parameters to control which parts of the region metadata 215 may be modified. If the region access logic 212 determines that the requested changes are not allowed, the request to modify settings of the region 214 may fail. In another example, the request to modify settings of the region 214 may include a request to enable replication and/or may include identifiers for regions and/or memory appliances to which the data of the region 214 of the memory appliance 110 may be replicated. When replication is enabled, the observer logic 218 may replicate affected portions of the region 214 to the regions and/or memory appliances indicated in the request to modify settings for the region 214 using the methods described throughout. The region access logic 212 may respond to the request to modify settings for the region 214 with a response message. The response message may include the identifier associated with the region 214, information related to the modified region metadata 215, and/or a status, indicating whether the operation was successful.

Figure 5:
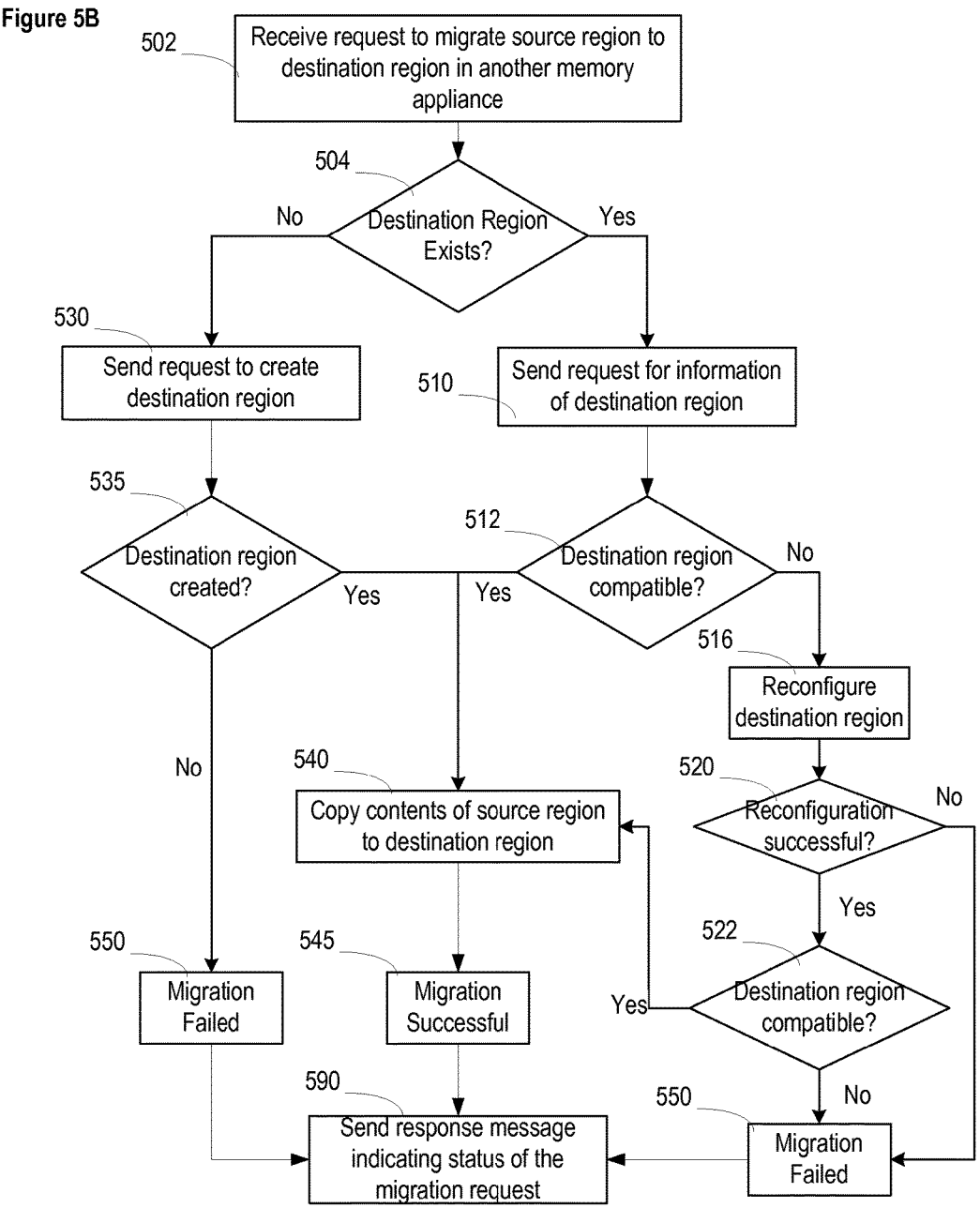
FIG. 5A and FIG. 5B illustrate an example scenario of a request to migrate a region.

FIGS. 5A and 5B illustrate an example scenario of a request to migrate a region. A request to migrate a region may indicate a request 502a to migrate data from a first region 214a included in a memory of a first memory appliance, 110a to a second region 214b included in a memory of a second memory appliance 110b, as illustrated in FIG. 5A. The request to migrate the first region 214a to the second region 214b may be a request 502a received by the region access logic 212a of the first memory appliance 110a and/or a request 502b received by the region access logic 212b of the second memory appliance 110b.

FIG. 5B illustrates an exemplary flowchart of steps taken upon receipt of a request 502a to migrate the first region 214a by the region access logic 212a of the first memory appliance 110a (502). The region access logic 212a may determine if the second region has to be newly created within the second memory appliance (504). The request 502a to migrate the first region 214a may include an identifier for the second memory appliance 110b. Alternatively or in addition, the request 502a to migrate the first region 214a may include an identifier for the second region 214b. Alternatively, or in addition, the request 502a to migrate the first region 214a may indicate creating the second region 214b at the second memory appliance 110b, in case the second region 214b does not exist (530). If creation of the second region 214b fails, the migration request 502a may fail (530, 550). Alternatively, if the second region 214b is successfully created, the contents of the first region 214a may be transferred to the second region 214b as part of a successful migration (540, 545).

If the request 502a to migrate the first region 214a includes the identifier for the second region 214b, the region access logic 212a may send a request to get a list of available regions and/or a request to get information of the second region 214b to the region access logic 212b of the second memory appliance 110b (510). The received information of the second region 214b may be analyzed to determine if the second region 214b is compatible to complete the migration request 502a (512). For example, if the response to the request to get the list of available regions indicates failure and/or does not include the identifier for the second region 214b, then the request 502a to migrate the first region 214a may fail (550). Alternatively, or in addition, if the response to the request to get information for the second region 214b indicates failure and/or includes information indicating that the second region 214b cannot be used to hold all of the data of the first region 214a, then the request 502a to migrate the first region 214a may fail (550).

Information indicating that the second region 214b is incompatible for completion of the migration request 502a, such as cannot be used to hold all of the data of the first region 214a, may include a size of the second region 214b that is smaller than the size of the first region 214a, access permissions for the second region 214b that indicate that the first memory appliance 110a may not write to the second region 214b, or any other limiting information. In such cases of incompatibility, the first memory appliance 110a may request reconfiguring the second region 214b so as to conform the second region 214b for the migration (516). For example, if the size of the second region 214b is smaller than the size of the first region 214a, the region access logic 212a of the first memory appliance 110a may send a request to resize the second region 214b to the region access logic 212b of the second memory appliance 110b. If the response to the reconfiguration request, such as the request to resize the second region 214b, indicates failure (520), the request 502a to migrate the first region 214a may fail (550). In case, the reconfiguration is successful, the first memory appliance 110a may confirm that the second region 214b is now compatible for the migration (522). Once compatibility is confirmed, the region access logic 212a may attempt to perform a first client-side memory access to write data from the first region 214a to the second region 214b (540) and on successful completion, mark the migration as successful (545).

Copying data from the first region 214a to the second region 214b may further involve transferring any changes that may be made to the first region 214a which are not captured by the first client-side memory access (540). For example, the client 130 may continue to access the region 214a during the client-side memory access, including writing to the region 214b. Concurrently with the client-side memory access, the observer logic 218a of the first memory appliance 110a may observe which portions of the first region 214a are modified during the client-side memory access. Upon completing the first client-side memory access, the region access logic 212a may attempt to perform client-side memory access to write the modified portions from the first region 214a to the second region 214b (540). The region access logic 212a and observer logic 218a may repeat this procedure until no portions are left to be migrated. Alternatively, or in addition, the region access logic 212a of the first memory appliance 110a may modify the access permissions of the first region 214a to prohibit writing additional changes to the first region 214a. For example, the access permissions may be changed after the number or total data size of the portions left to be migrated is above or below a configured threshold. The migration may complete when there are no portions left to be migrated. If the one or more attempts to perform client-side memory access fails, the request to migrate a region may fail.

Upon receipt of the request 502b to migrate the first region 214a by the region access logic 212b of the second memory appliance 110b, similar steps may be performed by the second memory appliance 110b. The region access logic 212b may determine if a new region needs to be created (504). The request to migrate the first region 214a may include an identifier for the first memory appliance 110a and/or the first region 214a. Alternatively or in addition, the request to migrate the region may include an identifier for the second region 214b. Alternatively, or in addition, the request 502b to migrate the first region 214a may indicate that a new region may be created at the second memory appliance 110b. The region access logic 212b may send a request to get a list of available regions and/or a request to get information for the first region to the region access logic 212a of the first memory appliance 110a. If the response to the request to get a list of available regions indicates failure and/or does not include the identifier for the first region 214a, then the request 502b to migrate the first region may fail (550). Alternatively, or in addition, if the response to the request to get information for the first region 214a indicates failure and/or includes information indicating that the second region 214b cannot be used to hold all of the data of the first region 214a, then the request 502b to migrate the first region 214a may fail (550). Information indicating that the second region 214b is incompatible for completion of the migration request 502b, such as, cannot be used to hold all of the data of the first region 214a, may include a size of the first region 214a that is larger than the size of the second region 214*b*, access permissions for the first region 214*a* that indicate that the second memory appliance 110*b* may not read from the first region 214*a*, or any other incompatibility criteria (512). In such cases of incompatibility, the second memory appliance 110*b* may reconfigure the second region 214*b* so as to conform the second region 214*b* for the migration 516). For example, if the size of the second region 214*b* is smaller than the size of the first region 214*a*, the region access logic 212*b* of the second memory appliance 110*b* may attempt to resize the second region 214*b* using the methods of the request to resize an existing region. If the attempt to resize the second region 214*b* fails, the request 502*b* to migrate a region may fail. In case, the reconfiguration is successful, the second memory appliance 110*b* may confirm that the second region 214*b* is now compatible for the migration (520, 522). Upon ensuring compatibility of the regions, the region access logic 212*b* may attempt to perform client-side memory access to read data from the first region 214*a* into the second region 214*b* and on successful completion, mark the migration as successful (522, 540, 545). If the attempt to perform client-side memory access fails, the request 502*b* to migrate a region may fail (550).

Prior to starting the client-side memory access, the region access logic 212*b* of the second memory appliance 110*b* may send a request to modify settings for the first region 214*a* to the region access logic 212*a* of the first memory appliance 110*a*. The request to modify settings for the first region 214*a* indicating that replication may be enabled from the first region 214*a* to the second region 214*b*. If the response to the request to modify settings for the first region 214*a* indicates failure, the request 502*b* to migrate the first region 214*a* may fail.

Upon completing the client-side memory access, the region access logic 212*b* of the second memory appliance 110*b* may send one or more requests to get information for the first region 214*a* to the region access logic 212*a* of the first memory appliance 110*a*, the requests to get information for the first region 214*a* requesting information about how much data has been written to the first region 214*a* but not yet replicated to the second region 214*b*. If the response to one or more of the requests to get information for the first region indicates failure, the request 502*b* to migrate the first region 214*a* may fail. Alternatively, one or more of the requests to get information for the first region 214*a* may be retried. The region access logic 212*b* of the second memory appliance 110*b* may send the requests to get information for the first region 214*a* until the response to one or more of the requests to get information for the first region 214*a* indicates that no data has been written to the first region 214*a* that is not replicated to the second region 214*b*. Alternatively, or in addition, the region access logic 212*b* of the second memory appliance 110*b* may send a second request to modify settings for the first region 214*a* to the region access logic 212*a* of the first memory appliance 110*a*, the second request to modify settings for the first region 214*a* requesting that the access permissions of the first region 214*a* be changed to prohibit additional changes to the first region 214*a*. For example, the access permissions may be changed after the number or total data size of the portions left to be migrated is above or below a configured threshold. If the response to the second request to modify settings for the first region 214*a* indicates failure, the request 502*b* to migrate the first region 214*a* may fail. The migration 502*b* may complete when there are no portions left to be migrated.

The region access logic 212*a* and/or 212*b*, that receives a request to migrate a region, may respond to the request 502*a* and/or 502*b* with a response message. The response message may include the identifier associated with the first region 214*a*, the identifier associated with the second region 214*b*, and/or a status, indicating whether the operation was successful.

The client logic 312 of the client 130 may transmit allocation logic requests to the allocation logic 412 included in the management server 120. Allocation logic requests may include requests to find available memory appliances, requests to query available space on a memory appliance, requests to create an external memory allocation, requests to resize an existing external memory allocation, requests to renew an external memory allocation, requests to destroy an external memory allocation, requests to persist and free an existing external memory allocation, requests to list existing external memory allocations, requests to get information regarding an external memory allocation, requests to restructure an external memory allocation, or any other request related to the management servers, the memory appliances, the external memory allocations, and/or the regions on the memory appliances. The allocation logic requests may be carried over any communications protocol and/or interface capable of carrying messages. For example, the allocation logic requests may be carried over UDP datagrams, a TCP connection, an SSL connection, Infini-Band reliable connections, RoCE, iWARP, HTTP, or any other communications protocol known now or later discovered. Alternatively, or in addition, allocation logic requests may be carried over remote procedure calls, such as using XML-RPC, SOAP, CORBA, Java Remote Method Invocation (Java RMI), and/or any other remote procedure call protocol. Alternatively, or in addition, the allocation logic requests may be carried over a communication protocol based on client-side memory access, such as by writing messages into a buffer on the management server 120 via client-side-memory access. Alternatively, or in addition, the allocation logic requests may be carried via invoking methods in an API. For example, if the client logic 312 and the allocation logic 412 are co-located or combined, the allocation logic requests may be methods in an API.

Figure 6:
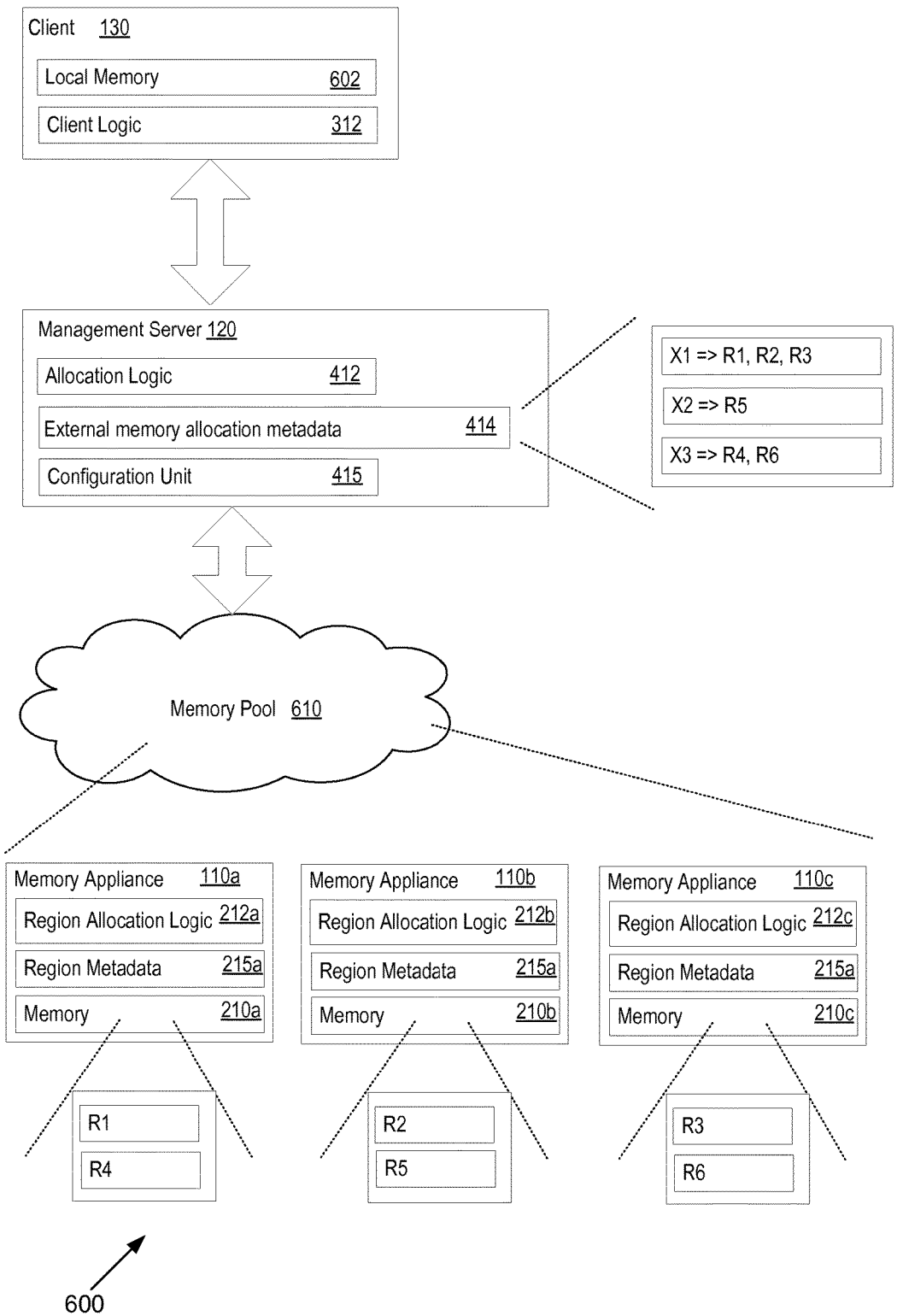
FIG. 6 illustrates an example external memory allocation system.

FIG. 6 illustrates an example external memory allocation system 600. The system 600 illustrates the client 130, the management server 120, and a memory pool 610. The memory pool 610 includes multiple memory appliances 110*a*-110*c*. While FIG. 6 illustrates only three memory appliances as being part of the memory pool 610, in other examples, the memory pool 610 may include fewer or more number of memory appliances. The client 130 includes the client logic 312 and local memory 602. The management server 120 includes the allocation logic 412 and the external memory allocation metadata 414. Each of the memory appliances 110*a*-110*c* includes respective region allocation logic 212*a*-212*c* and memories 210*a*-210*c*. The client 130, management server 120, and the memory appliances 110*a*-110*c* may include other components that are not illustrated in FIG. 6. The client 130 may request an external memory allocation, such as one of X1-X3, from the memory pool 610 via the management server 120 to complement the local memory 602. For example, the local memory 602 may not be sufficient to handle the tasks operating on the client 130, and therefore the client 130 may seek the external memory allocations X1-X3. Alternatively, or in addition, the client 130 may seek to use the external memory allocations X1-X3 as the primary memory with the local memory 602 as a cache.

The external memory allocations may reference one or more regions. The one or more regions referenced by an external memory allocation may be included in a single memory appliance, or the regions may be distributed between multiple memory appliances.

The management server 120 may include external memory allocation metadata 414. External memory allocation metadata 414 may include information describing the external memory allocations, such as indication of the regions referenced by the external memory allocation. For example, the external memory allocation X1 may reference regions R1-R3 as illustrated in FIG. 6, where R1 is within memory appliance 110a, R2 is within memory appliance 110b, and R3 is within memory appliance 110c. The external memory allocation X2 may reference a single region R5 from the memory appliance 110b, while the external memory allocation X3 may reference regions R4 and R6 on the memory appliances 110a and 110c respectively. It is understood that the described distributions of the regions are exemplary and that various other distributions of the regions referenced by an external memory allocation are possible. Further, while the example illustrates three external memory allocations X1-X3, other examples may involve fewer or more number of external memory allocations being present in the external memory allocation metadata 414. The memory appliances 110a-110c including the regions R1-R6 may be known to the allocation logic 412 of a management server 120 or associated with the management server 120 that is associated with the external memory allocation.

Further metadata may also be recorded in the external memory allocation metadata 414. For example, information describing the external memory allocation X1 may include the size of the external memory allocation X1, a lease expiration date and/or time for the external memory allocation X1, information about the regions R1-R3 referenced by the external memory allocation X1, and/or any other information relevant to the external memory allocation X1. Alternatively, or in addition, the external memory allocation X1 may include metadata describing one or more logical relationships between the regions R1-R3 referenced by the external memory allocation X1. The various entries in the external memory allocation metadata 414 may contain the same fields of information, or different fields of information. The fields of information described are exemplary and other types of information may be recorded in other examples. The external memory allocation metadata 414 may be included in the memory 410 included in the management server 120. Alternatively, or in addition, external memory allocation metadata 414 may be included in the backing store 460, if included in the management server 120.

The external memory allocation metadata 414 may be recoverable from the region metadata 215 included in one or more memory appliances 110a-110c. In an example, the external memory allocation metadata 414 may be included in the region metadata 215 of the memory appliances 110a-110c including one or more of the regions R1-R3 referenced by the external memory allocation. Accordingly, if the management server 120 fails, a backup management server may take its place by retrieving the external allocation metadata 414 from the region metadata 215 included in one of the memory appliances 110a-110c. In a second example, the external memory allocation metadata 414 may be distributed amongst the region metadata 215a-215c of the memory appliances 110a-110c including the regions R1-R3 referenced by the external memory allocation. Accordingly, if the management server 120 fails, a backup management server may take its place by retrieving the external allocation metadata 414 from the distributed portions included in the region metadata 215a-215c included in the memory appliances 110a-110c. In a third example, the external memory allocation metadata 414 may be derived from the region metadata 215a-215c of the memory appliances 110a-110c including one or more of the regions R1-R3 referenced by the external memory allocation. For example, the region metadata 215a may include information about other regions R2-R3 referenced by the same external memory allocation as the region R1. Alternatively, or in addition, the region metadata 215a may include information about the logical relationships between the regions R1-R3. Accordingly, if the management server 120 fails, a backup management server may take its place by retrieving the region metadata 215a-215c included in one or more of the memory appliances 110a-110c and deriving the external memory allocation metadata 414 from the retrieved region metadata 215a-215c. The allocation logic 412 included in the management server may retrieve region metadata 215a-215c from the respective memory appliance 110a-110c by sending a request to get information for a region to the respective region access logic 212a-212c included in the memory appliances 110a-110c.

The region metadata 215a-215c may include one or more flags, identifiers, semaphores and/or other data structures that may be used to identify the most up-to-date information that may be used to recover the external memory allocation metadata 414. For example, the region metadata 215a-215c may include an identifier of a primary region and/or a secondary region, of which the corresponding metadata contains a primary copy of the information and/or a secondary copy of the information. Alternatively, or in addition, all copies of the information and/or the corresponding regions may be ranked in order from primary, through last. Updates to the copies of the information may be performed in order from primary through last. Recovery of external memory allocation data 414 may be performed by attempting to recover from the copies of the information in order from primary through last. For example, if an attempt to recover external memory allocation metadata 414 from a primary copy of the information fails, a second attempt may be made using the secondary copy, and so on.

An external memory allocation may be associated with one or more management servers. An external memory allocation may be associated with the management server that was used to create the external memory allocation. Alternatively, or in addition, an external memory allocation may be associated with other management servers, such as a backup management server, a centralized management server, a localized management server, a task-specific management server, and/or any other management server. An external memory allocation may become associated with a management server by replicating information about the external memory allocation from one or more management servers associated with the external memory allocation or from one or more memory appliances including the regions referenced by the external memory allocation.

The external memory allocation metadata 414 may be recoverable from information about the external memory allocation replicated onto other management servers. For example, a copy of the external memory allocation metadata 414 may exist on one or more management servers. The external memory allocation metadata 414 may include one or more flags, identifiers, semaphores and/or other data structures that may be used to identify the most up-to-date copy of the external memory allocation metadata 414. For example, the external memory allocation metadata 414 may include an identifier of a primary management server and/or a secondary management server which contains a corresponding primary copy and/or a secondary copy. Alternatively, or in addition, all copies and/or the corresponding management servers may be ranked in order from primary, through last. Updates to the copies of the information may be performed in order from primary through last. Recovery of external memory allocation metadata may be performed by attempting to recover from the copies of the information in order from primary through last. For example, if the primary management server fails, an attempt may be made to use a new management server in place of the primary management server and to recover the external memory allocation metadata 414 from the secondary management server. If the attempt to recover the external memory allocation metadata 414 from the secondary management server fails, a second attempt may be made using the tertiary management server, and so on. Alternatively, or in addition, recovery of external memory allocation metadata 414 may be performed by attempting to assign a new primary management server for the external memory allocation in order from primary through last. For example, if the primary management server fails, an attempt may be made to assign a new primary management server to be the secondary management server. Furthermore, if the attempt to assign the new primary management server for the external memory allocation to be the secondary management server fails, a second attempt may be made using the tertiary management server, and so on. If all management servers associated with an external memory allocation have failed, recovery may proceed using the region metadata, as described.

Upon receiving a request to find available memory appliances, the allocation logic 412 may reply with a list of memory appliances associated with the management server 120 including the allocation logic 412 receiving the request. Alternatively or in addition, the allocation logic 412 may reply with a list of memory appliances known to the allocation logic 412. Alternatively or in addition, the allocation logic 412 may reply with a list of memory appliances meeting a set of characteristics and/or configurations specified by the request.

Upon receiving a request to query available space on the memory appliances, the allocation logic 412 may determine the available space on the memory appliances, such as 110a-110c, associated with the management server 120 including the allocation logic 412 and/or known to the allocation logic 412. The allocation logic 412 may determine the available space on a memory appliance, such as 110a, by sending a request to get the status of the memory 210a included in the memory appliance 110a to the region access logic 212a of the memory appliance 110a. Upon receiving the response message in response to the request to get the status of the memory 210a included in the memory appliance 110a, the allocation logic 412 may inspect the response message to determine the available space on the memory appliance 110a. Alternatively, or in addition, the allocation logic 412 may determine the available space on the memory appliance 110a by reading region metadata 215a, if included in the memory 410 of the management server 120. The region metadata 215a may be updated upon startup of the allocation logic 412 and/or management server 120, upon detection of memory appliances 110a-110c, upon association with memory appliances 110a-110c, periodically, upon receiving a management request, when requested by the user interface, upon creating a region with a memory appliance, upon occurrence of any other event, and/or at any other time. The region metadata 215a may be updated by sending requests to get the status of the memory 210a included in the memory appliance 110a. Alternatively, or in addition, the region metadata 215a may be updated by receiving an asynchronous notification of the status of the memory 210a, such as the response message to the request to get the status of the memory 210a included in the memory appliance 110a. The response messages to the request to get the status of the memory 210a included in the memory appliance 110a may be sent by the region access logic 212a in response to any event, such as a change in the region metadata 215a included in the memory 210a of the memory appliance 110a. Upon receiving the response messages to the requests to get the status of the memory included in the memory appliances 110a-110c, the allocation logic 412 may inspect the response messages to determine the available space on the memory appliances 110a-110c and/or update the region metadata 215a-215c. The allocation logic 412 may respond to the request to query available space on memory appliances 110a-110c with a response message. The response message may include a summary of the status of the memory on the memory appliances 110a-110c to which the allocation logic 412 sent the requests to get the status of the memory included in the memory appliance 110a to the region access logic 212a of the memory appliance 110a and/or of the memory 210a-210c on the memory appliances 110a-110c which are described in the region metadata 215a-215c. For example, the response message may include an aggregate of the total memory available to hold regions, the amount of memory currently in use by existing regions, and/or the amount of memory available to hold additional regions. Alternatively, or in addition, the response message may include the status of the memory on each of the memory appliances 110a-110c to which the allocation logic 412 sent the requests to get the status of the memory included in the memory appliance to the region access logic of the memory appliance and/or of the memory on the memory appliances 110a-110c which are described in the region metadata. Alternatively, or in addition, the response message may include a status, indicating whether the operation was successful.

Upon receiving a request to create an external memory allocation, the allocation logic 412 may determine how to structure the external memory allocation. The request may be received from the client 130. Alternatively, or in addition, the request may be sent by a user via the user interface to provision external memory for the client 130. In an example, the allocation logic 412 may determine to structure the external memory allocation as a single region on a single memory appliance (such as external memory allocation X2 of FIG. 6). In a second example, the allocation logic 412 may determine to structure the external memory allocation as multiple regions on multiple memory appliances (such as external memory allocations X1 and X3 of FIG. 6). In a third example, the allocation logic 412 may determine to structure the external memory allocation using one or more logical relationships, such as striping with parity, between multiple regions on multiple memory appliances. The allocation logic 412 may determine how to structure the external memory allocation, using an algorithm or heuristic.

The dynamic allocation of external memory may include a provisioning of a predetermined amount of memory for the client and/or for a user account on the client. One or more subsequent requests to allocate external memory for the client and/or the user account may be allocated from the predetermined amount of external memory that was provisioned for the client and/or for the user account. The request to allocate external memory and/or a subsequent request to allocate external memory may result in allocation of a subset or all of the provisioned external memory. The provisioning may be part of the dynamic allocation of the external memory. Alternatively or in addition, the provisioning may be separate from the allocation of the external memory. Thus, allocation may or may not include the provisioning depending on, for example, whether sufficient external memory has already been provisioned. The provisioning of the memory may reserve the memory such that after the memory is reserved for the client, the reserved memory may not be accessed by other clients unless the reserved memory is freed. Alternatively or in addition, if provisioned to a user account, the reserved memory may not be accessed by other user accounts until the reserved memory is freed.

Provisioning may be the reservation of memory, but alternatively or in addition, provisioning the external memory may include providing an indication of how to allocate memory, in other words, provisioning may include providing or creating an indication of an allocation strategy. The allocation logic, for example, may use the indication of the allocation strategy to determine the allocation strategy used in allocating memory. The indication of the allocation strategy may be created by a user logged into a user account, such as an administrator account. Alternatively or in addition, the indication of the allocation strategy may be created by a configuration unit 415 or any other module. The configuration unit may be a component that creates the indication of the allocation strategy based on information received through a third user interface and/or API. The third user interface may be included, in some examples, in the user interface and/or the second user interface described above. The third user interface may be a graphical user interface, a web interface, a command-line interface, an API, and/or any other type of interface or combination of interfaces known now or later discovered through which data may be received.

The configuration unit 415 may be included in the management server 120 as illustrated in FIG. 6. Alternatively or in addition, the configuration unit 415 may be included in any other device, such as the client 130 or the memory appliance 110.

The indication of the allocation strategy may include one or more steps and/or rules that the allocation logic follows to determine how to allocate external memory. Determining how to allocate external memory, for example, may include identifying the memory appliances on which to allocate requested memory. Alternatively, or in addition, the indication of the allocation strategy may include profiles for memory appliances, clients, and/or user accounts. The profiles may indicate to the allocation logic how to allocate the memory.

Creating or providing the indication of the allocation strategy may be provisioning external memory for one or more of the clients, for one or more user accounts, and/or for predetermined purposes. In a first example, creating the indication of the allocation strategy may include associating a user account with a high priority setting. Creating such an association may provision external memory for use by the user account from a set of the memory appliances that are configured to be used by any high priority user accounts. In a second example, creating the indication of the allocation strategy may include setting a time limit for a user account, such as a time-of-day limit or a duration-of-use limit. Setting the time limit may provision external memory for use by the user account only during predetermined times, such as during a predetermined time of day or during predetermined days of a week, or only for a predetermined length of time. In a third example, creating the indication of the allocation strategy may include setting a maximum external memory usage limit for a user account, thus limiting the amount of external memory that may be allocated to the third user account. In a fourth example, creating the indication of the allocation strategy may include creating one or more steps and/or rules that indicate the allocation logic is to prefer to allocate memory on the memory appliances having low network bandwidth when satisfying requests from the clients that have low network bandwidth. In other words, low network bandwidth clients may be provisioned with low network bandwidth external memory and/or lower speed external memory. The client profile, for example, may indicate that the client is a low network bandwidth client. In a fifth example, creating the indication of the allocation strategy may include identifying one or more steps and/or rules that indicate the allocation logic is to prefer to allocate memory on the memory appliances that have a network locality near to the clients. In other words, external memory may be provisioned to the clients with a network locality within a threshold distance of the memory appliances that contain the provisioned memory. Other examples of provisioning may include configuring the allocation logic to execute any of the other steps/rules described elsewhere in this document. Provisioning external memory may include configuring any of the characteristics and/or configurations of the memory appliance, the client, and/or the user account described elsewhere in this document on which the allocation logic determines how to allocate memory. The steps and/or rules to use may be configured for each memory appliance, for each client, and/or for each user account. Alternatively or in addition, the steps and/or rules to use may be configured globally for all memory appliances, clients, and/or user accounts. The steps and/or rules to use may be configured with relative priorities to each other, such as by ranking the steps and/or rules in order of precedence. All or part of the profiles may be determined and/or identified by the allocation logic. For example, the allocation logic may auto-detect that the client and/or the memory appliance has low network bandwidth by measuring performance and/or by retrieving information indicating performance.

The allocation logic 412 may include one or more steps and/or rules to determine which memory appliances to use or select for a particular external memory allocation. The allocation logic 412 may determine the memory appliances based on factors such as, how much memory to use on each memory appliance, which one or more logical relationship types to use if any, which restrictions to place upon the external memory allocation if any, and/or whether to reject the request. For example, the allocation logic 412 may use memory appliances that are associated with the management server 120 and/or known to the allocation logic 412 of the management server 120. Alternatively, or in addition, the allocation logic 412 may determine the memory appliances to use based on a profile that includes one or more of the characteristics and/or configurations of the memory appliances.

In a first example, the allocation logic 412 may use or select memory appliances that have the least amount of available memory while still having enough to hold the entire external memory allocation in a single region. In a second example, the allocation logic 412 may use or select memory appliances that have network locality near to the client 130. In a third example, the allocation logic 412 may use or select memory appliances that have a backing store. In a fourth example, the allocation logic 412 may use or select memory appliances that have low network utilization. In a fifth example, the allocation logic 412 may use or select memory appliances that have low latency for client-side memory access. In a further example, the allocation logic

412 may use or select memory appliances that have high bandwidth for client-side memory access.

Alternatively, or in addition, the allocation logic 412 may utilize a profile that includes one or more characteristics and/or configurations of the client 130 and/or of a user account. In addition to those listed elsewhere in this disclosure, characteristics and/or configurations of the client 130 and/or of the user account may include, for example: relative priority, absolute priority, quotas, maximum external memory usage limits, current external memory usage, maximum persistent external memory usage limits, current persistent external memory usage, maximum volatile external memory usage limits, current volatile external memory usage, time-of-day limits, duration-of-use limits, last access time, maximum allowed not-in-use threshold, and/or any other properties describing the capabilities of, actions of, and/or privileges assigned to, the client 130 and/or the user account. In a first example, the allocation logic 412 may use or select memory appliances with older hardware revisions for user accounts with low relative priority. In a second example, the allocation logic 412 may use or select memory appliances with low latency for client-side memory access for clients with high absolute priority. In a third example, the allocation logic 412 may reject a request to create an external memory allocation outside a time-of-day limit for the user account. In a further example, the allocation logic 412 may prefer to use or select memory appliances with low network bandwidth for clients with low network bandwidth. In a fifth example, the allocation logic 412 may assign a short lease time for user accounts with a short duration-of-use limit.

Alternatively, or in addition, a separate module, other than the allocation logic 412 may be included in the management server 120 to determine the distribution of the external memory across the memory appliances. Alternatively, or in addition, the distribution may be determined by the client logic 312 and/or the region access logic 212. Alternatively, or in addition, the determination of the distribution of the regions of the external memory allocation may be distributed between multiple logics, such as the client logic 312 and the allocation logic 412. All of, or a portion of, the steps performed for the determination may be included in the request to create an external memory allocation or in any other message or data sent from the client logic 312 to the allocation logic 412. Alternatively or in addition, the request to create an external memory allocation may include an indication of which factors to use to determine how to structure the external memory allocation. Alternatively or in addition, the request to create an external memory allocation may include parameters to be used when determining the structure of the external memory allocation. For example, the parameters may include one or more physical locations to be used when choosing memory appliances based upon physical locations. Alternatively, or in addition, the parameters may include information describing the user account and/or access parameters to be used when choosing memory appliances based upon user accounts. Alternatively, or in addition, the user account and/or access parameters may be specified at the time a connection, such as an SSL connection, is established between the client logic 312 and the allocation logic 412.

Figure 7:
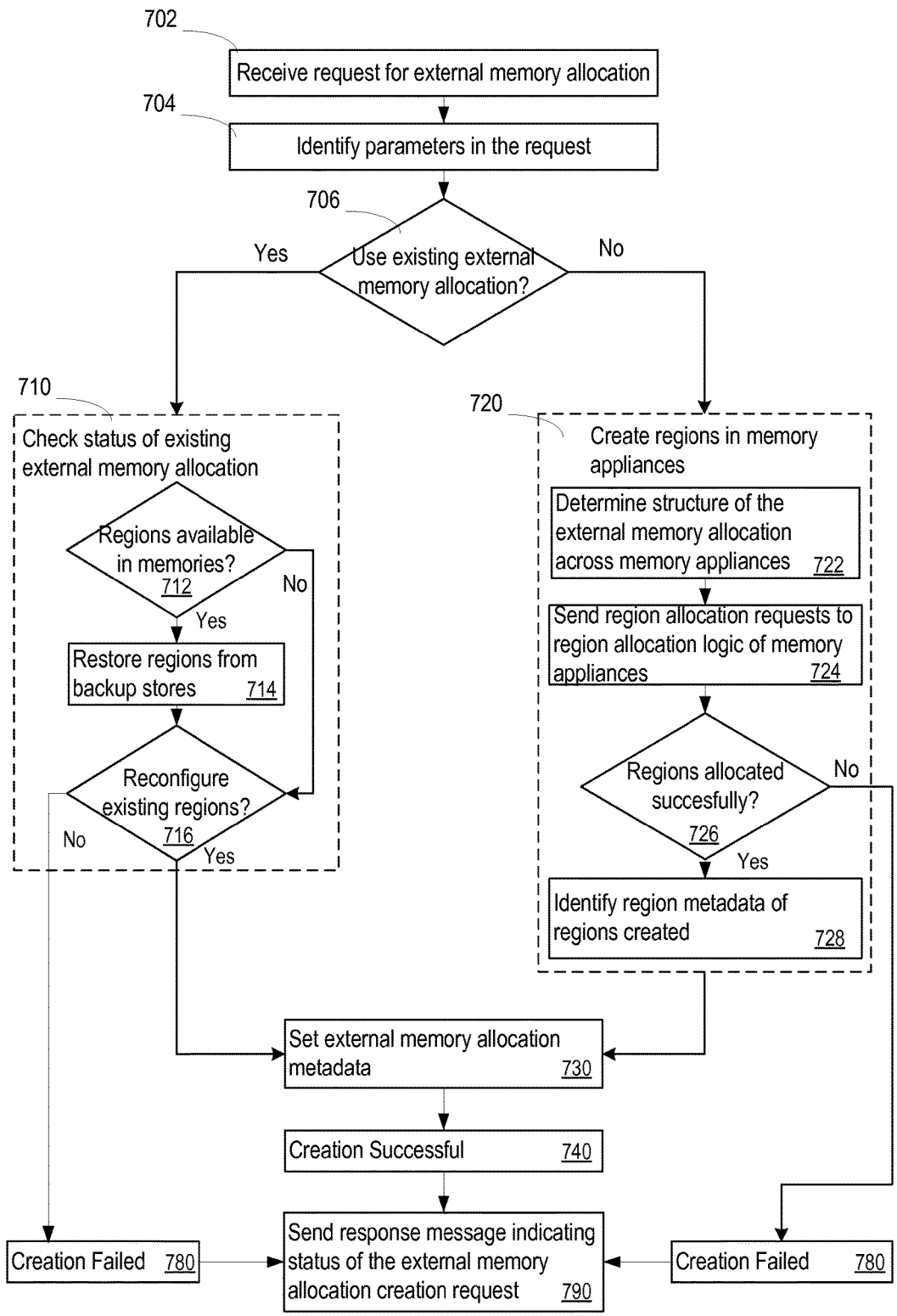
FIG. 7 illustrates an example flowchart for creation of an external memory allocation.

FIG. 7 illustrates an example flowchart for creation of an external memory allocation. The request to create an external memory allocation may include additional parameters that the allocation logic 412 may use to affect the external memory allocation, the regions, the logical relationships between the regions, and/or a combination of these (702, 704). In a first example, the request to create an external memory allocation may include a size to use for the external memory allocation. In a second example, the request to create the external memory allocation may include a preferred external memory allocation identifier. The preferred external memory allocation identifier may refer to an existing external memory allocation. If an existing external memory allocation referenced by the preferred external memory allocation identifier exists, the allocation logic 412 may select the existing external memory allocation instead of creating a new external memory allocation (706, 710). The allocation logic 412 may perform additional checks before selecting an existing external memory allocation, such as confirming that the other parameters specified in the request to create an external memory allocation match the existing external memory allocation (710). Upon selecting an existing external memory allocation, if the regions referenced by the existing external memory allocation are not included in the memories of the corresponding memory appliances, the allocation logic 412 may send a request to restore the contents of a region from a backing store for each region referenced by the existing external memory allocation (712, 714). Alternatively, or in addition, the request to create an external memory allocation may include an indicator that only existing external memory allocations may be considered when attempting to satisfy the request. If no existing external memory allocations match the parameters indicated in the request to create an external memory allocation, then the request to create an external memory allocation may fail (780). Alternatively, the allocation logic 412 may reconfigure existing regions by sending region reconfiguration requests to the region access logic 212 of the memory appliances including the existing regions (716). For example, the allocation logic 412 may request the region access logic 212 to resize the existing regions, or revise other parameters such as the access parameters associated with the existing region. In case reconfiguration of the existing region fails, the external memory allocation may fail (780). In another example, if the request for external memory allocation indicates, such as using parameters, a preference not to use reconfigured regions, the request may fail (716, 780). Alternatively, the allocation logic 412 may proceed to request creation of memory regions instead of the request failing (720). In a third example, the request to create an external memory allocation may include an allocation type. The allocation type may indicate how the allocation logic 412 and/or the region access logic 212 may treat the external memory allocation after it is created.

In a first example, the allocation type may indicate that the external memory allocation may be treated as volatile. A volatile external memory allocation may be destroyed if the allocation logic 412 determines that the external memory allocation is no longer in use. As such, a client logic 312 may avoid memory leaks by specifying that its external memory allocation may be treated as volatile, since a failure of the client 130, the client logic 312, and/or the application logic 314 may eventually lead to the allocation logic 412 determining that the external memory allocation is no longer in use, then destroying it.

The allocation logic 412 may determine whether or not an external memory allocation is in use by requesting and/or inspecting the status of the external memory allocation and/or of the regions referenced by the external memory allocation. The status may include an indication of how many clients are accessing the external memory allocation and/or the regions referenced by the external memory allocation. Alternatively, or in addition, the status may include an indication of the last time at which a client accessed the external memory allocation and/or the regions referenced by the external memory allocation. The allocation logic 412 may determine that the external memory allocation is not in use if the status indicates the last time at which a client accessed the external memory allocation and/or the regions referenced by the external memory allocation was older than a not-in-use threshold. The not-in-use threshold may be a parameter of the request to create an external memory allocation. Alternatively, or in addition, the not-in-use threshold may be specified by an administrator using the user interface. Alternatively, or in addition, the not-in-use threshold may be determined automatically, such as based-upon an algorithm, a heuristic, and/or a formula. An example algorithm, heuristic, and/or formula may adjust the not-in-use threshold based upon the characteristics and/or configuration of the management server 120 and/or of the memory appliances 110a-110c, such as the amount of available memory. Alternatively, or in addition, the allocation logic 412 may determine whether or not an external memory allocation is in use by inspecting region metadata 215 and/or external memory allocation metadata 414, if either or both are included in the management server 120. Region metadata may include an indication of the last time at which a client accessed the region. External memory allocation metadata 414 may include an indication of the last time at which a client accessed the external memory allocation.

In a second example, the allocation type may indicate that the external memory allocation may be treated as persistent. A persistent external memory allocation may be preserved if the allocation logic 412 determines that the external memory allocation is no longer in use. A persistent external memory allocation may be preserved by enabling the external memory allocation and/or the regions referenced by the external memory allocation to continue to exist as created. Alternatively, or in addition, if the allocation logic 412 determines that the external memory allocation is no longer in use, the allocation logic 412 and/or the region access logic 212 may automatically persist the external memory allocation and/or the regions referenced by the external memory allocation to the backing stores and remove one or both from memory. As such, the client logic 312 may avoid memory leaks by specifying that its external memory allocation may be treated as persistent with a not-in-use threshold, since a failure of the client 130, the client logic 312, and/or the application logic 314 may eventually lead to the allocation logic 412 determining that the external memory allocation is no longer in use, then persisting it and removing it from memory. The allocation logic 412 updates the external memory allocation metadata according to the allocation type specified (730).

The allocation logic 412 may also associate an external memory identifier with the external memory allocation metadata (730). The external memory identifier may be chosen by the allocation logic 412 or it may be included in the request to create an external memory allocation. For example, the external memory identifier may be the preferred external memory identifier included in the request to create an external memory allocation.

The allocation logic 412 may send a request to create a region to the region access logic 212 of each memory appliance selected to hold memory regions referenced by the external memory allocation (720, 722, 724). The memory appliances are selected as described earlier. Upon receiving the response message in response to each request to create a region, the allocation logic 412 may inspect the response message and/or record any relevant metadata (728). In case any of the region allocation requests fail, the creation of the external memory allocation may fail (780).

The allocation logic 412 may respond to the request to create an external memory allocation with a response message. The response message may include the external memory identifier. Alternatively, or in addition, the response message may include identifiers and/or information describing the regions referenced by the external memory allocation and/or the logical relationships between the regions. Alternatively, or in addition, the response message may include a status, indicating whether the operation was successful (790, 740, 780).

Upon receiving a request to resize an existing external memory allocation, the allocation logic 412 may determine how to structure the resized external memory allocation. In a first example, the allocation logic 412 may determine to structure the resized external memory allocation as a single region on a single memory appliance. In a second example, the allocation logic 412 may determine to structure the external memory allocation as multiple regions on multiple memory appliances. In a third example, the allocation logic 412 may determine to structure the external memory allocation using one or more logical relationships, such as striping with parity, between multiple regions on multiple memory appliances. Determining how to structure the resized external memory allocation may include determining whether to resize the existing regions referenced by the external memory allocation, whether to create additional regions, and/or whether to replace existing regions with new regions.

The allocation logic 412 may determine how to structure the resized external memory allocation. As additional examples to those listed elsewhere in this disclosure, the allocation logic 412 may resize existing regions when expanding or contracting an external memory allocation that only references one region, if sufficient space is available in the memory of the memory appliance including the region. In another example, the allocation logic 412 may create additional regions when expanding an external memory allocation that uses a logical relationship involving a concatenation of the regions referenced by the external memory allocation. In another example, the allocation logic 412 may resize existing regions when expanding or contracting an external memory allocation that uses a logical relationship involving striping and/or mirroring, if sufficient space is available in the memory of the memory appliances including the regions referenced by the external memory allocation.

The allocation logic 412 may create additional regions by sending a request to create an external memory allocation to the region access logic 212 of the memory appliances selected to include the additional regions. Alternatively, or in addition, the allocation logic 412 may resize existing regions by sending a request to resize an existing region to the region access logic 212 of the memory appliances including the existing regions. Alternatively, or in addition, the allocation logic 412 may destroy existing regions by sending a request to destroy a region to the region access logic 212 of the memory appliances including the existing regions.

The allocation logic 412 may replace an existing region with a new region by creating the new region, then replicating the data from the existing region onto the new region. For example, the allocation logic 412 may perform client-side memory access to read the data from the existing region and write to the new region. Alternatively, or in addition, the allocation logic 412 may send a request to migrate a region to the region access logic 212 of the memory appliance including the existing region and/or to the region access logic 212 of the memory appliance selected to include the new region.

The allocation logic 412 may respond to the request to resize an existing external memory allocation with a response message. The response message may include the external memory identifier. Alternatively, or in addition, the response message may include identifiers and/or information describing the regions referenced by the external memory allocation and/or the logical relationships between the regions. Alternatively, or in addition, the response message may include a status, indicating whether the operation was successful.

Upon receiving a request to renew an external memory allocation, the allocation logic 412 may update the external memory allocation metadata 414 associated with the external memory allocation identified by the request. The request to renew an external memory allocation may include an external memory allocation identifier. Alternatively, or in addition, the request to renew an external memory allocation may include a value to be used for the not-in-use threshold of the external memory allocation. The allocation logic 412 may respond to the request to renew an external memory allocation with a response message. The response message may include a status, indicating whether the operation was successful. Alternatively, or in addition, the response message may include the not-in-use threshold of the external memory allocation and/or the time left until the external memory allocation may be considered not-in-use.

Upon receiving a request to destroy an external memory allocation, the allocation logic 412 may send to the region access logic 212 of each corresponding memory appliance, a request to destroy a region for each region referenced by the external memory allocation. Upon receiving the response message in response to each request to destroy a region, the allocation logic 412 may inspect the response message and/or record any relevant metadata. The allocation logic 412 may respond to the request to destroy an external memory allocation with a response message. The response message may include a status, indicating whether the operation was successful.

Upon receiving a request to persist and free an existing external memory allocation, the allocation logic 412 may, for each region referenced by the external memory allocation, send to the region access logic 212 of each corresponding memory appliance, a request to persist a region to a backing store and remove it from memory. Upon receiving the response message in response to each request to persist a region to a backing store and remove it from memory, the allocation logic 412 may inspect the response message and/or record any relevant metadata 414. The allocation logic 412 may respond to the request to persist and free an existing external memory allocation with a response message. The response message may include a status, indicating whether the operation was successful.

Upon receiving a request to list existing external memory allocations, the allocation logic 412 may respond with a response message. The response message may include a list of external memory allocation identifiers for the external memory allocations associated with the management server 120. For example, in case of the system as illustrated in FIG. 6, the management server 120 may provide a list containing information of the external memory allocations X1-X3. Alternatively, or in addition, the response message may include a status, indicating whether the operation was successful.

Upon receiving a request to get information regarding an external memory allocation, the allocation logic 412 may respond with a response message. The response message may include the external memory identifier. Alternatively, or in addition, the response message may include identifiers and/or information describing the regions referenced by the external memory allocation and/or the logical relationships between the regions.

For example, in case the allocation logic 412 of the management server 120 of FIG. 6 receives a request to get information regarding the external memory allocation X1, the allocation logic 412 may retrieve region metadata 215*a-c* by sending a request to get information for the regions R1-R3 referenced by X1. The requests may be sent to the region access logic 212*a*-212*c* included in the memory appliances 110*a*-110*c* including the regions R1-R3. The identifiers and/or information may include access parameters for the regions, such as a password and/or an encryption key. Alternatively, or in addition, the response message may include metadata describing the external memory allocation X1, such as the not-in-use threshold for the external memory allocation X1 and/or for the regions R1-R3. Alternatively, or in addition, the response message may include a status, indicating whether the operation was successful.

Upon receiving a request to restructure an external memory allocation, the allocation logic 412 may determine how to structure the external memory allocation. The allocation logic 412 may determine how to structure the external memory allocation as described elsewhere in this disclosure. Alternatively, or in addition, the request to restructure an external memory allocation may include parameters specifying a desired structure for the external memory allocation and/or specifying parameters to be used to determine a revised structure. For example, the parameters may cause the allocation logic 412 to use a logical relationship involving striping between the regions referenced by the external memory allocation. Alternatively, or in addition, the parameters may cause the allocation logic 412 to use memory appliances with higher or lower bandwidth than the memory appliances including the regions currently referenced by the external memory allocation. Alternatively, or in addition, the parameters may cause the allocation logic 412 to use memory appliances that are closer to or farther from a specified physical and/or network location than the memory appliances including the regions currently referenced by the external memory allocation. As such, a request to restructure an external memory allocation may be used to migrate data closer to or further away from the client 130, for increasing or decreasing locality and/or for increasing or decreasing performance. This migrating of data may be part of a broader approach for balancing the cost/performance of memory included in the client 130, memory included in the memory appliances, and/or other media capable of holding the data, such as the backing store or other backing stores. Determining how to structure the external memory allocation may include determining whether to resize the existing regions referenced by the external memory allocation, whether to create additional regions, and/or whether to replace existing regions with new regions. The allocation logic 412 may resize the existing regions referenced by the external memory allocation, create additional regions, and/or replace existing regions with new regions using the methods described throughout this disclosure.

Using information provided by the allocation logic 412, by the region access logic 212, or both, the client logic may access one or more regions using client-side memory access. The client 130 may present a data interface to the application logic 314. The data interface may take many forms and/or may depend upon the preferences of the application logic 314 and/or of the users. Some examples of data interfaces may include: an API, block-level interface, a character-level interface, a memory-mapped interface, a memory allocation interface, a memory swapping interface, a memory caching interface, a hardware-accessible interface, a graphics processing unit (GPU) accessible interface and/or any other interface used to access the data and/or metadata of the memory appliance 110, the management server 120, the region 214, the external memory allocation, and/or the regions referenced by the external memory allocation. Alternatively or in addition, the data interface may include multiple interfaces. The data interface may be a data interface unit. The functionality of any of the data interfaces may be provided using all of or a portion of the functionality of any one or more of the other data interfaces. For example, a block-level interface may use methods of an API in order to retrieve and/or manipulate external memory allocations and/or the regions referenced by an external memory allocation. Alternatively, or in addition, an API may include methods to manipulate a block device interface.

In a first example, the data interface may include an API. An API may provide methods for the application logic 314 to invoke that manipulate a region. The methods for the application logic 314 to invoke that manipulate a region may include methods that manipulate data included in the region, methods that manipulate the metadata associated with the region, methods that manipulate the access controls for the region, and/or any other methods related to the region. For example, a method may enable the application logic 314 to read or write data to a specific location within the region. Alternatively, or in addition, an API may provide methods for the application logic 314 to invoke that manipulate an external memory allocation. The methods for the application logic 314 to invoke that manipulate an external memory allocation may include methods that manipulate data included in the regions referenced by the external memory allocation, methods that manipulate the metadata associated with the regions, methods that manipulate the metadata associated with the logical relationships between the regions, methods that manipulate the metadata associated with the external memory allocation, methods that manipulate the access controls for the regions, methods that manipulate the access controls for the external memory allocation, and/or any other methods related to the external memory allocation, the logical relationships between the regions, and/or the regions referenced by the external memory allocation. In an example, a method may enable the application logic 314 to read or write data to a specific location within the external memory allocation. Reading data from a first location within an external memory allocation may cause data to be read from one or more second locations within one or more regions referenced by the external memory allocation. Writing data to a first location within an external memory allocation may cause data to be written to one or more second locations within one or more regions referenced by the external memory allocation. The second locations and the regions may be determined based upon the logical relationships between the regions. In a second example, a method may enable the application logic 314 to run a consistency check upon an external memory allocation that uses a parity-based logical relationship. In a third example, a method may facilitate the application logic 314 to register the memory of the client and/or a portion of the memory with one or more communication interfaces. Registering memory may cause subsequent client-side memory access operations using the registered memory to proceed more quickly and/or more efficiently than operations not using the registered memory.

Alternatively, or in addition, an API may provide methods for the application logic 314 to invoke that retrieve, present, and/or manipulate information related to the management servers, the memory appliance, the external memory allocations, the regions referenced by the external memory allocations, and/or the logical relationships between the regions. The methods may provide functionality similar to the allocation logic requests and/or region access logic requests. Alternatively, or in addition, the methods may provide functionality similar to a combination of one or more of the allocation logic requests and/or region access logic requests. In a first example, an API may provide methods for the application logic 314 to retrieve a list of management servers. In a second example, an API may provide methods for the application logic 314 to retrieve a list of memory appliances, such as the memory appliances associated with a management server and/or known by the allocation logic of a management server. In a third example, an API may provide methods for the application logic 314 to retrieve a list of external memory allocations, such as the external memory allocations associated with a management server. In a fourth example, an API may provide methods for the application logic 314 to retrieve a list of regions, such as the regions included in the memory of a memory appliance or the regions associated with an external memory allocation. In a fifth example, an API may provide methods for the application logic 314 to retrieve information related to an external memory allocation, such as the size of the external memory allocation, the regions referenced by the external memory allocation, and/or the logical relationships between the regions. In a fifth example, an API may provide methods for the application logic 314 to manipulate an external memory allocation. An API may manipulate the external memory allocation using the allocation logic requests and/or the region access logic requests. In a sixth example, an API may provide methods for the application logic 314 to manipulate a region. An API may manipulate a region using the region access logic requests.

In a second example, the data interface may include a block-level interface. The block-level interface may provide block-level access to data of a region. Alternatively or in addition, the block-level interface may provide block-level access to data of one or more of the regions referenced by an external memory allocation. Alternatively or in addition, the block-level interface may provide block-level access to data of the external memory allocation. Block-level access to data may include reading data from or writing data to a consistently-sized and/or aligned portion of a region or an external memory allocation. The client logic may provide block-level access using a block device interface. Alternatively, or in addition, the client logic may provide block-level access using any storage protocol now known or later discovered. A storage protocol may be any communications protocol used to transfer data between a block storage device, interface, or system, such as the block-level interface or any other data interface, and a device or system, such as the client or another client, that stores data in, and/or retrieves data from, the block storage device, interface, or system. A storage protocol may be implemented, for example, using one or more software and/or hardware storage controllers. The storage protocol and electrical characteristics of the hardware storage controller may be part of a common standard. In one example, the storage protocol may be the universal serial bus mass storage device class (USB MSC or UMS), which is a set of computing communications protocols defined by the USB Implementers Forum that runs on a hardware bus, such as the one or more interconnects, that conforms to the USB standard. In a second example, the storage protocol may be the Small Computer System Interface (SCSI) command protocol. In a third example, the storage protocol may be the Serial Advanced Technology Attachment (SATA) protocol. Additional examples of the storage protocol include Serial Attached SCSI (SAS) and Internet Small Computer System Interface (iSCSI). Alternatively or in addition, the block-level interface may provide block-level access using any storage protocol that transfers data with a data transfer protocol, such as SCSI over Fiber Channel, SCSI RDMA Protocol (SRP) over Remote Direct Memory Access (RDMA), iSCSI over TCP/IP, or any other combination of storage protocol and data transfer protocol known now or discovered in the future. Alternatively, or in addition, the block-level interface may provide block-level access by emulating the storage protocol and/or data transfer protocol. In one example, the block-level interface may provide block-level access by providing a SCSI command interface to the application logic. In a second example, the block-level interface may provide block-level access using a storage protocol with an emulated data transfer protocol, such as with a virtualized communication interface.

In a third example, the data interface may include a character-level interface. The character-level interface may provide character-level and/or byte-level access to data of a region. Alternatively or in addition, the character-level interface may provide character-level and/or byte-level access to data of one or more of the regions referenced by an external memory allocation. Alternatively or in addition, the character-level interface may provide character-level and/or byte-level access to data of the external memory allocation. The client logic may provide character-level access using a character device interface. Character-level access may enable the application logic 314 to read and/or write to character-aligned portions of the external memory allocation or of the regions referenced by the external memory allocation. Byte-level access may enable the application logic 314 to read and/or write to byte-aligned portions of the external memory allocation or of the regions referenced by the external memory allocation. Alternatively or in addition, the character-level interface may enable the application logic 314 to seek to a specified location within the external memory allocation or the regions referenced by the external memory allocation. Seeking to a specified location may cause subsequent attempts to read and/or write to the external memory allocation or the regions referenced by the external memory allocation to start at the most recently seeked-to location. Alternatively, or in addition, attempts to read and/or write to the external memory allocation or the regions referenced by the external memory allocation may start at a location after the most recently read and/or written portion.

In a fourth example, the data interface may include a memory-mapped interface. The memory mapped interface may enable the application logic 314 to map all of or a portion of a region, an external memory allocation and/or of one or more regions referenced by the external memory allocation into a virtual address space, such as the virtual address space of the application logic. The memory-mapped interface may include an API. Alternatively, or in addition, the memory-mapped interface may include and/or utilize a block-level interface and/or a character-level interface. In one example, the memory-mapped interface may enable the application logic 314 to map all of or a portion of a block device interface into a virtual address space, such as the virtual address space of the application logic.

The memory mapped interface may include a page fault handler method. The page fault handler method may be executed when the application logic attempts to access a first portion of the virtual address space. The first portion may be configured to trigger the page fault handler when accessed. The first portion may be a page of the virtual address space. Alternatively, or in addition, the first portion may be included in the mapped portion of the virtual address space. The page fault handler may perform client-side memory access to read a second portion of the external memory allocation and/or of one or more regions referenced by the external memory allocation into a third portion of the memory of the client. The third portion may be a page of the memory of the client. Alternatively, or in addition, the page fault handler may allocate the third portion of the memory of the client 130. The page fault handler may map the first portion of the virtual address space to the third portion of the memory. The first portion may correspond to the second portion. For example, the offset of the first portion within the mapped portion of the virtual address space may equal the offset of the second portion within the external memory allocation or the regions referenced by the external memory allocation. Alternatively, or in addition, the second portion may include a fourth portion corresponding to the third portion. The portion of the second portion not included in the fourth portion may be considered a fifth portion. For example, the page fault handler method may determine based upon a pattern of calls to the page fault handler method that the fifth portion of the external memory allocation and/or of the one or more regions may be needed soon and therefore, may be read into the memory in anticipation, such as with a read-ahead predicting algorithm.

Alternatively, or in addition, the memory mapped interface may include a background process. The background process may periodically flush dirty pages. Flushing dirty pages may include performing client-side memory access to write the data from the dirty pages to the corresponding locations within the external memory allocation and/or the one or more regions referenced by the external memory allocation. Dirty pages may be pages included in the memory of the client which have been written to by the application logic 314 and/or the client logic 312 since they were last read from or written to the external memory allocation and/or the one or more regions referenced by the external memory allocation.

Alternatively, or in addition, the memory mapped interface may include a page evicting method. Pages to be evicted may include the one or more pages of the memory used to hold the third portion of the memory of the client. The page evicting method may be executed when the memory-mapped interface determines that the pages to be evicted are unlikely to be accessed again soon, when the memory-mapped interface determines that the pages to be evicted are needed to hold data for other executions of the page fault handler method, and/or when the pages to be evicted are needed to hold data for any other purpose. If one or more of the pages to be evicted are dirty pages, the page evicting method may perform client-side memory access to write data from the dirty pages to a corresponding portion of the external memory allocation and/or the regions referenced by the external memory allocation. The page evicting method may update metadata to indicate that the pages to be evicted may be re-used for other purposes, such as by the page fault handler method.

In a fifth example, the data interface may include a memory allocation interface. The memory allocation interface may include an API. The memory allocation interface may include one or more methods that enable the application logic 314 to allocate individual buffers. For example, an application may allocate a buffer to hold an integer, an array of integers, a character, a string, and/or any other data. Alternatively, or in addition, the memory allocation interface may include one or more methods that enable an application-level memory allocator to allocate slabs of memory. A slab of memory may include one or more pages. The one or more pages included in the slab may be contiguous in a physical address space and/or in a virtual address space. A slab of memory may be further sub-divided by the application-level memory allocator. For example, the application-level memory allocator may enable the application logic 314 to allocate individual buffers from portions of the slab of memory. The memory allocation interface may utilize a memory-mapped interface. For example, allocating the individual buffers and/or allocating the slabs of memory may include mapping all of or a portion of an external memory allocation and/or of one or more regions referenced by the external memory allocation into a virtual address space, such as the virtual address space of the application. The virtual address of an individual buffer and/or of a slab may be included in a portion of the virtual address space corresponding to a portion of the external memory allocation and/or of the regions. Alternatively, or in addition, allocating the individual buffers and/or allocating the slabs of memory may include creating one or more external memory allocations and/or regions. The memory allocation interface may be made available selectively to one or more application logics. Alternatively, or in addition, the memory allocation interface may be made available to all application logics.

In a sixth example, the data interface may include a memory swapping interface. The memory swapping interface may include an API. The memory swapping interface may enable the application logic 314 to remove infrequently accessed data from primary memory. In one example implementation, the application logic 314 may be an operating system, or a portion of an operating system, such as a kernel and/or a memory management subsystem. The memory swapping interface may include a block-level interface. The memory swapping interface may include a swap device. Alternatively, or in addition, the memory swapping interface may include a character-level interface. For example, the memory swapping interface may emulate a swap file using a character device interface and/or a block device interface. The memory swapping interface may be made available to all applications in the client 130, such as the application logic 314, or to a subset of applications. The memory swapping interface may include a transcendental memory interface. For example, the memory swapping interface may include a front-swap interface. The front-swap interface may include one or more methods to initialize the front-swap interface, to store a page, to get a page, to invalidate a page, and/or to invalidate multiple pages.

A method to initialize the front-swap interface may initialize metadata. The metadata may include offsets within the external memory allocations and/or the regions for where to find the data from zero or more pages. The metadata may include one or more data structures to facilitate fast lookup of the offsets. For example, the metadata may include a hash table, a red-black tree, a radix tree, and/or any other data structure known now or later discovered. The one or more data structures may be indexed and/or may include an index based upon an identifier for the zero or more pages. The metadata may be included in the memory of the client. Alternatively, or in addition, the metadata may be included in the external memory allocations, regions referenced by the external memory allocations, in the region metadata 215, and/or in the external allocation metadata 318.

A method to store a page may perform client-side memory access to write data from the page to a corresponding portion of one or more external memory allocations and/or one or more regions referenced by the one or external memory allocations. Alternatively, or in addition, the method to store a page may update metadata indicating the presence and/or offset of the data from the page in the external memory allocations and/or the regions. The method to store a page may perform client-side memory access to read and/or write the metadata from/to a location within the external memory allocations and/or regions referenced by the external memory allocations.

A method to get a page may perform client-side memory access to read data into the page from a corresponding portion of the external memory allocations and/or the regions referenced by the external memory allocations. The method to get a page may utilize the metadata and/or the one or more data structures to determine the offset for where to find the data from the page. The method to get a page may perform client-side memory access to read and/or write the metadata from/to a location within the external memory allocations and/or regions referenced by the external memory allocations.

A method to invalidate a page may update metadata indicating the non-presence of the data from the page in the external memory allocations and/or the regions. Updating the metadata may include updating the one or more data structures. The method to invalidate a page may perform client-side memory access to read and/or write the metadata from/to a location within the external memory allocations and/or regions referenced by the external memory allocations. Alternatively, or in addition, the method to invalidate a page may perform client-side memory access to overwrite data from the page to a corresponding portion of the external memory allocations and/or the regions referenced by the external memory allocations.

A method to invalidate multiple pages may update metadata indicating the non-presence of the data from the multiple pages in the external memory allocation and/or the regions. The multiple pages may be all pages associated with a specified swap area, swap device, swap partition, and/or swap file. Updating the metadata may include updating the one or more data structures. For example, updating the metadata may include emptying and/or removing one or more data structures. The method to invalidate a page may perform client-side memory access to read and/or write the metadata from/to a location within the external memory allocations and/or regions referenced by the external memory allocations. Alternatively, or in addition, the method to invalidate multiple pages may perform client-side memory access to overwrite data from the multiple pages to one or more corresponding portions of the external memory allocations and/or the regions referenced by the external memory allocations.

In a seventh example, the data interface may include a memory caching interface. The memory caching interface may include an API. The memory caching interface may enable the application logic 314 to store data from secondary memory in external memory. For example, the memory caching interface may store data from secondary memory in regions, in an external memory allocation, and/or in the regions referenced by the external memory allocation. In one example implementation, the application logic 314 may be an operating system, or a portion of an operating system, such as a kernel and/or a page cache subsystem. Data from secondary memory may include data from a block-level interface, from a block device interface, from a file system, and/or from any other form of secondary memory. In one example, data from secondary memory may include pages of data from a file system. The memory caching interface may be made available to all applications in the client 130, such as the application logic 314. The memory caching interface may include a page-caching interface. Alternatively, or in addition, the memory may include a transcendental memory interface. For example, the memory caching interface may include a clean-cache interface. The clean-cache interface may include one or more methods to initialize a file system cache, to put a page, to get a page, to invalidate a page, and/or to invalidate multiple pages.

A method to initialize a file system cache may initialize metadata. The metadata may include offsets within the external memory allocations and/or the regions for where to find the data from zero or more pages. The metadata may include one or more data structures to facilitate fast lookup of the offsets. For example, the metadata may include a hash table, a red-black tree, a radix tree, and/or any other data structure known now or later discovered. The one or more data structures may be indexed and/or may include an index based upon an identifier for the zero or more pages, an identifier for the file system, an identifier for a file system object, any other identifier relevant to the data being stored in external memory, and/or a combination of multiple identifiers, such as a concatenation and/or hash of identifiers. The file system object may be an inode, a file, a directory, and/or any other representation of data in a file system. The metadata may be included in the memory of the client 130. Alternatively, or in addition, the metadata may be included in the external memory allocations, regions referenced by the external memory allocations, in the region metadata, and/or in the external allocation metadata. Alternatively, or in addition, a method to initialize a file system cache may initialize a file system cache for a shared and/or clustered file system. Alternatively, or in addition, the memory caching interface may include a separate method to initialize a file system cache for a shared and/or clustered file system.

A method to put a page may perform client-side memory access to write data from the page to a corresponding portion of one or more external memory allocations and/or one or more regions referenced by the one or more external memory allocations. Alternatively, or in addition, the method to put a page may update metadata indicating the presence and/or offset of the data from the page in the external memory allocations and/or the regions. The method to put a page may perform client-side memory access to read and/or write the metadata from/to a location within the external memory allocations and/or regions referenced by the external memory allocations.

A method to get a page may perform client-side memory access to read data into the page from a corresponding portion of the external memory allocations and/or the regions referenced by the external memory allocations. The method to get a page may utilize the metadata and/or the one or more data structures to determine the offset for where to find the data from the page. The method to get a page may perform client-side memory access to read and/or write the metadata from/to a location within the external memory allocations and/or regions referenced by the external memory allocations.

A method to invalidate a page may update metadata indicating the non-presence of the data from the page in the external memory allocations and/or the regions. Updating the metadata may include updating the one or more data structures. The method to invalidate a page may perform client-side memory access to read and/or write the metadata from/to a location within the external memory allocations and/or regions referenced by the external memory allocations. Alternatively, or in addition, the method to invalidate a page may perform client-side memory access to overwrite data from the page to a corresponding portion of the external memory allocations and/or the regions referenced by the external memory allocations.

A method to invalidate multiple pages may update metadata indicating the non-presence of the data from the multiple pages in the external memory allocation and/or the regions. The multiple pages may be all pages associated with a specified block device interface, file system, and/or file system object. Updating the metadata may include updating the one or more data structures. For example, updating the metadata may include emptying and/or removing one or more data structures. The method to invalidate a page may perform client-side memory access to read and/or write the metadata from/to a location within the external memory allocations and/or regions referenced by the external memory allocations. Alternatively, or in addition, the method to invalidate multiple pages may perform client-side memory access to overwrite data from the multiple pages to one or more corresponding portions of the external memory allocations and/or the regions referenced by the external memory allocations.

In an eighth example, the data interface may include a hardware-accessible interface. The hardware-accessible interface may be a physically-addressable interface. A physically-addressable interface may be an interface which provides access to the underlying data using physical addresses, such as the physical addresses used on an address bus, a CPU interconnect, and/or on a peripheral interconnect. The hardware-accessible interface may enable a hardware application component to access data of a region. Alternatively or in addition, the hardware-accessible interface may enable the hardware application component to access data of one or more of the regions referenced by an external memory allocation. Alternatively or in addition, the hardware-accessible interface may enable the hardware application component to access data of the external memory allocation. The hardware application component may be a processor, a GPU, a communication interface, a direct memory access controller, an FPGA, an ASIC, a chipset, a hardware logic, and/or any other physical component that accesses memory. The hardware application component may be included in the application logic 314. The hardware-accessible interface may include a hardware client component. A hardware client component may be a processor, a GPU, an MMU, an IO-MMU, a communication interface, such as the one or more communication interfaces, an FPGA, an ASIC, a chipset, a hardware logic, a memory access transaction translation logic, any other hardware component, and/or a combination of multiple hardware components. The hardware client component may be included in the client logic. The hardware client component, the hardware application component, and/or the one or more communication interfaces may be embedded in one or more chipsets. The hardware client component may include a memory and/or cache. The memory and/or cache of the hardware client component may be used to hold portions of the data of external memory allocations and/or regions. Alternatively, or in addition, the hardware client component may utilize a portion of the memory of the client to hold portions of the data of external memory allocations and/or regions. The hardware client component may respond to and/or translate attempts to access virtual addresses, physical addresses, logical addresses, IO addresses, and/or any other address used to identify the location of data. Alternatively, or in addition, the hardware client component may participate in a cache coherency protocol with the hardware application component. In a first example, the hardware client component may respond to attempts of the hardware application component to access physical addresses by accessing data included in the memory and/or cache of the hardware client component. In a second example, the hardware component may interface with a CPU interconnect and handle cache fill requests by reading data from the memory and/or cache included in the hardware client component. In a third example, the hardware client component may redirect and/or forward attempts of the hardware application component to access physical addresses to alternate physical addresses, such as the physical addresses of the portion of the memory of the client utilized by the hardware component. In a fourth example, the hardware client component may translate attempts of the hardware application component to access physical addresses into client-side memory access. For example, the hardware client component may interface with the CPU interconnect and handle cache fill requests by performing client-side memory access to read the requested data from the external memory allocation. Alternatively, or in addition, the hardware client component may handle cache flush requests by performing client-side memory access to write the requested data to the external memory allocation. Alternatively, or in addition, the hardware client component may handle cache invalidate requests by updating the memory and/or cache of the hardware client component to indicate the non-presence of the data indicated by the cache invalidate requests. In a fifth example, the hardware client component may translate attempts of the hardware application component to access IO addresses into client-side memory access. For example, the hardware client component may interface with a peripheral interconnect, such as PCI Express, and respond to requests to read a portion of the IO address space by reading data from the memory included in the hardware client component, by reading the portion of the memory and/or cache of the client utilized by the hardware component, and/or by performing client-side memory access to read the requested data from the external memory allocation.

In a ninth example, the data interface may include an interface to enable peripheral devices of the client 130 to access the external memory allocations. For example, the data interface may include a Graphics Processing Unit (GPU) accessible interface. The GPU accessible interface may enable a GPU application to access data of a region. Alternatively or in addition, the GPU accessible interface may enable the GPU application to access data of one or more of the regions referenced by an external memory allocation. Alternatively or in addition, the GPU accessible interface may enable the GPU application to access data of the external memory allocation. The GPU application may be an application logic, such as the application logic, executable on one or more processors of a GPU. The GPU may be included in the client. The GPU may include a client-side memory access interface that may enable the GPU application and/or the GPU accessible interface to perform client-side memory access using the one or more communication interfaces included in the client. The client-side memory access interface may be a GPUDirect, which is a trademark of NVIDIA Corporation, RDMA interface. The GPU accessible interface may include any one or more data interfaces. The GPU accessible interface may provide the one or more data interfaces to the GPU application. Examples of data interfaces included in the GPU-accessible interface and/or provided to the GPU application may be: an API, a block-level interface, a character-level interface, a memory-mapped interface, a memory allocation interface, a memory swapping interface, a memory caching interface, a hardware-accessible interface, any other interface used to access the data of the external memory allocations and/or of the regions, and/or a combination of data interfaces.

Ownership of and/or access to the external memory allocation and/or the region may be transferred from one client to another. Ownership may be an association in the metadata of the external memory allocation and/or the region with the client, an account on the client, and/or a virtual machine on the client. A capability to transfer ownership from one client to another may facilitate moving the application logic from one client to another client more efficiently and/or more rapidly. For example, the application logic may include a virtual machine that is to be migrated from a hypervisor running on a first client to a hypervisor running on a second client. When migrating data of the virtual machine, the hypervisors or other component may elect not to migrate data that is stored in the external memory allocation and/or the region. The hypervisors or other component may instead transfer ownership of and/or access to the external memory allocation and/or the region from the first client to the second client. For example, the allocation logic 412 may update the metadata to transfer the ownership. By updating the metadata to transfer ownership, the data stored in the external memory allocation and/or the region may be effectively migrated from hypervisor of the first machine to the hypervisor of the second machine without copying the data. Alternatively, or in addition, ownership of and/or access to the external memory allocation and/or the region may be associated with the virtual machine that is being migrated, and the ownership and/or access may be transferred implicitly as the virtual machine is migrated. Alternatively, or in addition, prior to migrating the virtual machine, the hypervisor and/or the virtual machine may elect to discard cached copies of data that are otherwise stored in the external memory allocation and/or the region, which may reduce the total amount of data to be migrated with the virtual machine. Ownership of and/or access to the external memory allocation and/or the region may be transferred from one client to another by sending, for example, a request to modify settings for the region to the region access logic of each memory appliance which includes the regions for which ownership or and/or access is being transferred.

The hypervisor, the virtual machine, and/or another component may elect to allocate additional external memory for use by the virtual machine using the methods described in this document. For example, the hypervisor or another component may allocate an additional external memory allocation and/or an additional region and assign the additional external memory to the virtual machine. Alternatively, or in addition, the virtual machine may allocate an additional external memory allocation and/or an additional region for use by the virtual machine. Alternatively or in addition, the hypervisor, the virtual machine, and/or another component may resize an existing external memory allocation and/or region. Allocating additional external memory for use by the virtual machine may be done in place of or in addition to allocating additional local memory for use by the virtual machine. For example, if not enough local memory is available to satisfy the demand of an application running within the virtual machine, additional external memory may be allocated for use by the virtual machine in order to satisfy all or part of the demand. Using external memory may avoid a need to otherwise migrate the virtual machine to a different client to satisfy the virtual machine's demand for memory in cases where not enough local memory is available to allocate for use by the virtual machine.

The client 130, the memory appliance 110, and the management server 120 may be configured in any number of ways. In one example, the memory appliance 110 may be included in a computer. For example, the processor may be the CPU of the computer, the memory may be the memory of the computer, and the computer may include the communication interface 330. Alternatively or in addition, the memory appliance 110 may be a peripheral of a computer, including but not limited to a PCI device, a PCI-X device, a PCIe device, an HTX (HyperTransport eXpansion) device, or any other type of peripheral, internally or externally connected to a computer.

In a second example, the memory appliance 110 may be added to a computer or another type of computing device that accesses data in the memory appliance 110. For example, the memory appliance 110 may be a device installed in a computer, where the client 130 is a process executed by a CPU of the computer. The memory in the memory appliance 110 may be different than the memory accessed by the CPU of the computer. The processor in the memory appliance 110 may be different than the CPU of the computer.

In a third example, the memory appliance 110, the client 130, and/or the management server 120, may be implemented using a Non-Uniform Memory Architecture (NUMA). In NUMA, the processor may comprise multiple processor cores connected together via a switched fabric of point-to-point links. The memory controller may include multiple memory controllers. Each one of the memory controllers may be electrically coupled to a corresponding one or more of the processor cores. Alternatively, multiple memory controllers may be electrically coupled to each of the processor cores. Each one of the multiple memory controllers may service a different portion of the memory than the other memory controllers.

In a fourth example, the processor of the memory appliance 110, the client 130, and/or the management server 120 may include multiple processors that are electrically coupled to the interconnect, such as with a bus. Other components of the memory appliance 110, the client 130, and/or the management server 1202, such as multiple memories included in the memory, the communication interface, the memory controller, and the storage controller may also be electrically coupled to the interconnect.

In a fifth example, the external memory system may include multiple memory appliances, multiple regions, multiple region metadatas, multiple management servers, multiple external memory allocation metadatas, multiple allocation logics, multiple client logics, and/or multiple application logics.

In a sixth example, the client 130 may provide additional services to other systems and/or devices. For example, the client 130 may include a Network Attached Storage (NAS) appliance. Alternatively or in addition, the client 130 may include a Redundant Array of Independent Disks (RAID) head. Alternatively or in addition, the client 130 may provide file-level access to data stored in the memory appliance 110. Alternatively, or in addition, the client 130 may include a database, such as an in-memory database.

In a seventh example, multiple clients may utilize one or more memory appliances as shared memory. For example, the clients may include or interoperate with an application logic that relies on massive parallelization and/or sharing of large data sets. Examples of application logic that may use massive parallelization include logic that performs protein folding, genetic algorithms, seismic analysis, or any other computationally intensive algorithm and/or iterative calculations where each result is based on a prior result. The application logic 314 may store application data, application state, and/or checkpoint data in the regions of the one or more memory appliances and/or in an external memory allocation. The additional capabilities of the one or more memory appliances, such as low latency access and persistence to the backing store, may be exploited by the clients in order to protect against application crashes, a loss of power to the clients, or any other erroneous or unexpected event on any of clients. The clients may access the one or more memory appliances in a way that provides for atomic access. For example, the client-side memory access operations requested by the clients may include atomic operations, including but not limited to a fetch and add operation, a compare and swap operation, or any other atomic operation now known or later discovered. An atomic operation may be a combination of operations that execute as a group or that do not execute at all. The result of performing the combination of operations may be as if no operations other than the combination of operations executed between the first and last operations of the combination of operations. Thus, the clients may safely access the one or more memory appliances without causing data corruption.

The application logic 314, the client logic 312, the allocation logic 412, the observer logic 218, and/or the region access logic 212 may be co-located, separated, or combined. The actions performed by combined logic may perform the same or similar feature as the aggregate of the features performed by the logics that are combined. In a first example, all five logics may be co-located in a single device. In a second example, the region access logic 212 and the observer logic 218 may be combined into a single logic. In a third example, the client logic 312 and the observer logic 218 may be combined into a single logic. In a fourth example, the client logic 312 and the region access logic 212 may be combined. In a fifth example, the observer logic 218 may be in a device different from the memory appliance 110, such as the management server 120 and/or a metadata server. A metadata server may be one or more hardware and/or software entities that may participate in the processing of operations, but may not directly handle the data stored in the memory appliance 110. The metadata server may track statistics, coordinate persistence, coordinate data duplication, and/or perform any other activity related to the memory access operations. In a sixth example, the region access logic 212 and the allocation logic 412 may be combined into a single logic. In a seventh example, the client logic 312 and the allocation logic 412 may be combined into a single logic. In an eight example, the client logic 312 and the application logic 314 may be combined into a single logic. Other combinations of the various components are possible, just a few of which are described here.

The application logic 314, the client logic 312, the allocation logic 412, the observer logic 218, and/or the region access logic 212 may include computer code. The computer code may include instructions executable with the processor. The computer code may be written in any computer language now known or later discovered, such as C, C++, C#, Java, or any combination thereof. In one example, the computer code may be firmware. Alternatively or in addition, all or a portion of the application logic 314, the client logic 312, the allocation logic 412, the observer logic 218, the region access logic 212 and/or the processor may be implemented as a circuit. For example, the circuit may include an FPGA (Field Programmable Gate Array) configured to perform the features of the application logic 314, the client logic 312, the allocation logic 412, the observer logic 218, and/or the region access logic 212. Alternatively, or in addition, the circuit may include an ASIC (Application Specific Integrated Circuit) configured to perform the features of the application logic 314, the client logic 312, the allocation logic 412, the observer logic 218, and/or the region access logic 212. The circuit may be embedded in a chipset, a processor, and/or any other hardware device.

Alternatively, or in addition, a portion of the application logic 312, the client logic 312, the allocation logic 412, the observer logic 218, and/or the region access logic 212 and the processor may be implemented as part of the one or more communication interfaces or other hardware component. For example, the one or more communication interfaces or other hardware component may modify a portion of the memory when a write operation is performed. The observer logic 218 may periodically check the portion of memory and may take further action based on the contents of the portion and the region associated with the portion. The further action may include determining statistics related to the operations that are being and/or were performed, identifying portions that are being and/or have been written to and/or read from, persisting the contents of the portions to the backing store 260, duplicating the contents of the portions to a different region, a different memory appliance, an external server, and/or a backup device, and/or taking any other action related to the operations.

The system may be implemented in many different ways. Each module or unit, such as the client logic unit, the region access unit, the allocation logic unit, the configuration unit, may be hardware or a combination of hardware and software. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively or in addition, each module may include memory hardware, such as a portion of the memory 210, for example, that comprises instructions executable with the processor 240 or other processor to implement one or more of the features of the module. When any one of the module includes the portion of the memory that comprises instructions executable with the processor, the module may or may not include the processor. In some examples, each module may just be the portion of the memory 210 or other physical memory that comprises instructions executable with the processor 240 or other processor to implement the features of the corresponding module without the module including any other hardware. Because each module includes at least some hardware even when the included hardware comprises software, each module may be interchangeably referred to as a hardware module.

A non-transitory computer-readable storage medium may be provided that includes computer executable instructions. The storage medium may include instructions, which when executed by a processor, receive a first request for an external primary memory allocation. The first request may be received from an application logic unit of a device, where the first request for the external primary memory allocation is a request for memory that is external to the device but that is primary memory to the device. The storage medium may include instructions that are executable by the processor to determine an allocation strategy for the external primary memory allocation in response to receipt of the first request, where the allocation strategy includes identification of a memory appliance on which to allocate a region of memory. The storage medium may include instructions that are executable by the processor to send, over a network via a communication interface, a second request for allocation of the region of memory on the identified memory appliance.

Determining the allocation strategy may include selecting the memory appliance from a plurality of memory appliances on which to allocate the region of memory. Alternatively or in addition, determining the allocation strategy may include determining a number of regions to allocate for the external primary memory allocation.

In some examples, determining the allocation strategy may include selecting a first memory appliance and a second memory appliance from a plurality of memory appliances, and allocating a first region on the first memory appliance and a second region on the second memory appliance. Alternatively or in addition, determining the allocation strategy may include provisioning a predetermined amount of external primary memory for the client from which memory is allocated to the client in fulfillment of allocation requests received after receipt of the first request for the external primary memory allocation. Determining the allocation strategy may include determining a distribution across a plurality of memory appliances of memory to allocate for the external primary memory allocation based on a network location of the device relative to the memory appliances. Alternatively or in addition, determining the allocation strategy may include determining a distribution across memory appliances of memory to allocate for the external primary memory allocation based on a network bandwidth between the device and the memory appliances. Alternatively or in addition, determining the allocation strategy may include determining an amount of memory to allocate for the external primary memory allocation based on a profile associated with the client. In some examples, the storage medium may include instructions that are executable by the processor to receive a request to create, destroy, or modify the external primary memory allocation.

An apparatus may be provided that includes a client logic unit that may cause, in response to a memory allocation request, allocation of external memory that is accessible by the apparatus over an interconnect, where the external memory may be memory that is external to the apparatus. The client logic may access the external memory with client-side memory access over the interconnect. The external memory may be reserved for the apparatus until freed.

The apparatus may include a local memory. The client logic unit may cache, in the local memory, portions of data stored in the external memory, where the data is accessed in memory access operations performed on the external memory. The client-side memory access may include execution of a memory access operation that conforms to the Remote Direct Memory Access (RDMA) protocol.

The apparatus may include an allocation logic unit that receives a request from the client logic unit to allocate the external memory, wherein the allocation logic unit may select a memory appliance on which to allocate a region of the external memory, and the client logic unit may access the region of the external memory over the interconnect with client-side memory access.

The memory appliance may be selected for allocation of the external memory from multiple memory appliances. The selection may be based on performance criteria of the memory appliances.

The external memory may be accessible by an application logic unit through a data interface included in the apparatus. The data interface may be a memory allocation interface, a memory swapping interface, a memory caching interface, a block-level interface, a memory-mapped interface, a graphics processor unit (GPU) accessible interface, a character-level interface, and/or a hardware accessible interface. In some examples, a peripheral device of the apparatus may be provided access to the external memory via the data interface.

A memory appliance may be provided that includes a communication interface, a memory, and a region access unit. The region access unit may receive, over a network via the communication interface, a request to allocate a portion of the memory for use as an external primary memory of a client on the network. The external primary memory of the client may be primary memory of the client that is external to the client. The region access unit may allocate the portion of the memory for the client. The communication interface may provide the client access to the allocated portion of the memory via client-side memory access, where a central processing unit of at least one of the client or the memory appliance is bypassed in the client-side memory access.

A system may be provided that includes a communication interface and an allocation logic unit. The communication interface may receive a request to allocate external primary memory for a client. The allocation logic unit may determine a number of regions to allocate across multiple memory appliances on a network as part of the external primary memory. The allocation logic unit may send requests for allocation of the regions to the memory appliances over the network.

The system may include memory that includes external memory allocation metadata descriptive of external memory allocations. The external memory allocations may include the allocation of the regions distributed across the memory appliances on the network for the external primary memory.

The external memory allocation metadata may be replicated to a management server on the network. The external memory allocation metadata may be recovered from the management server if the system fails.

The allocation logic unit may determine, in response to a request to resize the external primary memory allocation, a second number of regions in which to divide the external primary memory. The allocation logic unit may further determine a distribution of the second number of regions across the memory appliances. The distribution of the regions of the external primary memory may be based on status information received from the memory appliances. The allocation logic unit may detect a second memory appliance on the network that was not previously detected. In response, the allocation logic unit may determine an availability of the second memory appliance for redistribution of at least one of the regions for the external primary memory.

An apparatus may be provided that includes a configuration unit that creates an indication of an allocation strategy. The indication of the allocation strategy may indicate, to an allocation logic unit, the allocation strategy for allocation of external memory across memory appliances. The allocation logic unit may determine the allocation strategy in response to requests for external memory.

The indication of the allocation strategy may indicate one or more steps and/or rules that the allocation logic unit follows in a determination of how to allocate the external memory. Alternatively or in addition, the indication of the allocation strategy may include a profile of a memory appliance, a client, and/or a user account. Alternatively or in addition, the indication of the allocation strategy may include a priority setting associated with a user account. Alternatively or in addition, the indication of the allocation strategy may include a time-of-day limit for a user account.

Alternatively or in addition, the indication of the allocation strategy may include a duration-of-use limit for a user account. Alternatively or in addition, the indication of the allocation strategy may include a maximum external memory usage limit. Alternatively or in addition, the indication of the allocation strategy may include a network bandwidth setting associated with a client and/or a user account that indicates the allocation strategy is to select the memory appliances having a corresponding network bandwidth. Alternatively or in addition, the indication of the allocation strategy may include a network locality setting associated with a client and/or a user account that indicates the allocation strategy is to select any of the memory appliances that are within a threshold distance of a client device that requested the external memory.

In an example, a non-transitory computer storage medium may include computer executable instructions, which when executed by one or more processors, may cause one or more of the following steps to be performed for dynamic allocation of external primary memory. A communication interface may receive a first request for an external primary memory allocation. The first request may be received over a network from a client logic unit. The first request may be for primary memory that is external to a device on the network that includes the client logic unit. The one or more processors may determine the allocation strategy for the external primary memory allocation in response to receipt of the first request. The allocation strategy may include identification of a memory appliance on which to allocate a memory region. Further, the communication interface may send a second request for allocation of the memory region on the identified memory appliance. Determining the allocation strategy may include selecting the memory appliance from a plurality of memory appliances on which to allocate the memory region. Determining the allocation strategy may further include determining a number of memory regions to allocate for the external primary memory allocation. Further yet, determining the allocation strategy may include selecting a first memory appliance and a second memory appliance from a plurality of memory appliances for allocation of a first memory region on the first memory appliance, and allocation of a second memory region on the second memory appliance.

The dynamic allocation of external primary memory may include a provisioning of a predetermined amount and/or a maximum amount of memory to allocate for the client. Alternatively, or in addition, determination of an amount of memory to allocate for the external primary memory allocation may be based on a parameter of the first request. In another case, the dynamic allocation of external primary memory may involve determination of an amount of memory to allocate for the external primary memory allocation based on a profile associated with the client. The first request may include a request to create, resize, or modify the external primary memory allocation.

In another example, an apparatus may include a local primary memory, one or more processors to execute an application-task, a client logic unit, and an application logic unit. The client logic unit may cause, in response to a memory allocation request by the application-task, a request for external primary memory to be sent over a network. The request may be for external primary memory, which is external to the apparatus. The application logic unit may cache, in the local primary memory, portions of data stored in the external primary memory that is accessed in memory access operations associated with the external primary memory. The apparatus may further include an allocation logic unit. The allocation logic unit may receive the memory allocation request from the application-task. The allocation logic unit may select, in response to the memory allocation request, a memory appliance on which to allocate a memory region of the external primary memory. The allocation logic unit, further, may send, in response to the memory allocation request, the request for external primary memory over the network to the memory appliance. The memory appliance may be selected for allocation of the external primary memory from among a plurality of memory appliances. The selection may be based on performance criteria of the memory appliances. The application logic unit may be further configured to access the external primary memory by requests transmitted to a data interface included in the apparatus. The data interface may provide access to the external primary memory at a block level and/or a character level. Further, a peripheral device of the apparatus may access the external primary memory via the data interface. In the apparatus, region metadata may be associated with the memory regions allocated as part of the external primary memory. The region metadata may represent a relationship between the memory regions.

In an example, a memory appliance may include a communication interface, a primary memory, and a region access unit. The region access unit may receive, over a network via the communication interface, a request to allocate a portion of the primary memory for use as an external primary memory of a client on the network. The external primary memory of the client may be external to the client. The region access unit may further allocate the portion of the primary memory. The communication interface may enable the client to access the allocated portion of the primary memory via client-side memory access. A client-side memory access may enable the allocated portion of the primary memory to be accessed directly by the client bypassing a processor of the memory appliance.

The memory appliance may also include a metadata unit. The metadata unit may initialize the allocated portion of the primary memory in accordance with parameters provided in the request to allocate the portion of the primary memory. The parameters may include access parameters. Alternatively, or in addition, the parameters may include an indication of whether or not the allocated portion of the primary memory is to be persisted to a backing store of the memory appliance.

A system may include a communication interface and an allocation logic unit. The communication interface may receive a request to allocate an external primary memory for a client. The allocation logic unit may determine a number of memory regions to allocate distributed across a plurality of memory appliances on a network as part of the external primary memory. The allocation logic unit may further send requests for allocation of the respective memory regions. The allocation logic unit may also determine, in response to a request to resize the external primary memory allocation, a new number of memory regions to divide the external primary memory. Further, the allocation logic unit may determine redistribution of the new number of memory regions of the external primary memory allocation across the memory appliances.

The system may further include an allocation metadata unit. The allocation metadata unit may associate the allocated memory regions from the memory appliances with the external primary memory. A distribution of the memory regions of the external primary memory may be based on status information received from the memory appliances. The allocation logic unit of the system may further detect a new memory appliance communicably connected to the allocation logic unit, and in response, determine availability of the new memory appliance for allocation of the memory regions for the external primary memory.

All of the discussion, regardless of the particular implementation described, is exemplary in nature, rather than limiting. For example, although selected aspects, features, or components of the implementations are depicted as being stored in memories, all or part of systems and methods consistent with the innovations may be stored on, distributed across, or read from other computer-readable storage media, for example, secondary storage devices such as hard disks, floppy disks, and CD-ROMs; or other forms of ROM or RAM either currently known or later developed. The computer-readable storage media may be non-transitory computer-readable media, which includes CD-ROMs, volatile or non-volatile memory such as ROM and RAM, or any other suitable storage device.

Furthermore, although specific components of innovations were described, methods, systems, and articles of manufacture consistent with the innovation may include additional or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same program. The components may be resident on separate hardware, such as separate removable circuit boards, or share common hardware, such as a same memory and processor for implementing instructions from the memory. Programs may be parts of a single program, separate programs, or distributed across several memories and processors.

The respective logic, software or instructions for implementing the processes, methods and/or techniques discussed throughout this disclosure may be provided on computer-readable media or memories or other tangible media, such as a cache, buffer, RAM, removable media, hard drive, other computer readable storage media, or any other tangible media or any combination thereof. The tangible media include various types of volatile and nonvolatile storage media. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code, or any type of other processor, operating alone or in combination. Likewise, processing strategies may include multiprocessing, multitasking, parallel processing and/or any other processing strategy known now or later discovered. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, CPU, GPU, or system.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments of the innovation have been described, it will be apparent to those of ordinary skill in the art that many more embodiments and implementations are possible within the scope of the innovation. Accordingly, the innovation is not to be restricted except in light of the attached claims and their equivalents.

What is claimed is:

1. An apparatus comprising:
   a processor configured to:
   create an indication of an allocation strategy, wherein the indication of the allocation strategy indicates the allocation strategy for allocation of external primary memory across one or more memory appliances, wherein the external primary memory is external to a client but is primary memory to the client, wherein the client is in communication with the apparatus or is included in the apparatus;
   determine the allocation strategy in response to a request for external primary memory based on the indication of the allocation strategy; and
   allocate one or more regions of the external primary memory across the one or more memory appliances in accordance with the allocation strategy,
   wherein the external primary memory on the one or more memory appliances is accessible with client-side memory access independent of all central processing units of the one or more memory appliances, and
   wherein a slab of the external primary memory is allocable at the client independent of the memory appliances, in response to a request at the client to allocate the slab, by a selection at the client of a subset of one of the one or more regions of the external primary memory previously allocated and a mapping at the client of the slab of the external primary memory into a virtual address space.

2. The apparatus of claim 1, wherein the processor is configured to follow one or more steps and/or rules, which are included the indication of the allocation strategy, in a determination of how to allocate the external primary memory.

3. The apparatus of claim 1, wherein the indication of the allocation strategy includes a profile of a memory appliance, the client, and/or a user account.

4. The apparatus of claim 1, wherein the indication of the allocation strategy includes a priority setting associated with a user account.

5. The apparatus of claim 1, wherein the indication of the allocation strategy includes a time-of-day limit for a user account.

6. The apparatus of claim 1, wherein the indication of the allocation strategy includes a duration of use limit for a user account.

7. The apparatus of claim 1, wherein the indication of the allocation strategy includes a maximum external primary memory usage limit.

8. The apparatus of claim 1, wherein the indication of the allocation strategy includes a network bandwidth setting associated with the client and/or a user account that indicates the allocation strategy is to select the memory appliances having a corresponding network bandwidth.

9. The apparatus of claim 1, wherein the indication of the allocation strategy includes a network locality setting associated with the client and/or a user account that indicates the allocation strategy is to select any of the memory appliances that are within a threshold distance of the client that requested the external primary memory.

10. A method of provisioning external memory, the method comprising:
    creating, by a configuration unit, an indication of an allocation strategy, the indication of the allocation strategy indicating the allocation strategy for allocation of an external primary memory;
    providing the indication of the allocation strategy to an allocation unit; and
    allocating, by the allocation unit, the external primary memory for a client based on the indication of the allocation strategy, wherein the external primary memory is external to the client but is primary memory to the client, wherein the external primary memory is accessible over a communication interface of the client with client-side memory access that is independent of a central processing unit of any memory appliance on which the external primary memory resides, and wherein a slab of the external primary memory is allocable at the client independent of any memory appliance on which the external primary memory resides, in response to a request at the client to allocate the slab, by the client selecting a subset of the external primary memory previously allocated and mapping the slab of the external primary memory into a virtual address space of the client.

11. The method of claim 10, wherein the client includes a virtual machine and the external primary memory is for use by the virtual machine.

12. The method of claim 11, wherein the virtual machine is a first virtual machine, the method further comprising migrating data stored in the external primary memory to a second virtual machine by changing ownership of the external primary memory from the first virtual machine to the second virtual machine.

13. The method of claim 11, further comprising resizing memory available to the virtual machine by allocating more or less external primary memory to the virtual machine.

14. The method of claim 10, wherein the client includes a virtual machine on a first physical machine, the external primary memory is allocated to the virtual machine and includes data accessed by the virtual machine from the first physical machine, the method further comprising migrating the virtual machine from the first physical machine to a second physical machine without copying the data by accessing the data in the external primary memory by the virtual machine from the second physical machine.

15. The method of claim 10, wherein the client includes a virtual machine on a first physical machine, the external primary memory is allocated to the virtual machine and includes data accessed by the virtual machine from the first physical machine, the method further comprising migrating the virtual machine from the first physical machine to a second physical machine without copying the data by discarding a cached copy of the data from the virtual machine.

16. A system comprising:
a communication interface configured to receive a request to allocate an external primary memory for a client, wherein the external primary memory is external to a client but is primary memory to the client; and
a processor configured to:
determine a number of regions to allocate across a plurality of memory appliances on a network as part of the external primary memory; and
send requests for allocation of the regions to the memory appliances over the network; wherein after the regions of the external primary memory are allocated on the memory appliances, the regions of the external primary memory are accessible with client-side memory access that is independent of central processing units of the memory appliances and wherein a slab of the external primary memory is allocable at the client independent of the memory appliances, in response to a request at the client to allocate the slab, by the client selecting a subset of one of the regions of the external primary memory previously allocated and mapping the slab of the external primary memory into a virtual address space of the client.

17. The system of claim 16 further comprising a memory, the memory comprising external memory allocation metadata descriptive of external memory allocations, the external memory allocations including the allocation of the regions distributed across the memory appliances on the network for the external primary memory.

18. The system of claim 17, wherein the external memory allocation metadata is replicated to a management server on the network, and the external memory allocation metadata is recovered from the management server if the system fails.

19. The system of claim 16, wherein the processor is further configured to:
determine, in response to a request to resize the external primary memory allocation, a second set of regions in which to divide the external primary memory; and
determine a distribution of the second set of regions across the memory appliances.

20. The system of claim 16, wherein a distribution of the regions of the external primary memory is based on status information received from the memory appliances.

21. The system of claim 16, wherein the processor is further configured to:
detect a second memory appliance on the network, the second memory appliance not included in the memory appliances across which the regions of the external primary memory are allocated; and
in response, determine availability of the second memory appliance for redistribution of at least one of the regions for the external primary memory.

22. A method comprising:
allocating an external primary memory for a client, wherein the external primary memory is external to the client but is primary memory to the client, wherein the external primary memory is accessible over a communication interface of the client with client-side memory access that is independent of a central processing unit of any memory appliance on which the external primary memory resides, and wherein a slab of the external primary memory is allocable at the client independently of any memory appliance on which the external primary memory resides, in response to a request at the client to allocate the slab, by the client selecting a subset of the external primary memory previously allocated and mapping the slab of the external primary memory into a virtual address space of the client, wherein the client includes a virtual machine on a first physical machine, the external primary memory is allocated to the virtual machine and includes data accessed by the virtual machine from the first physical machine; and
migrating the virtual machine from the first physical machine to a second physical machine without copying the data by accessing the data in the external primary memory by the virtual machine from the second physical machine.

* * * * *